US012621745B2

(12) United States Patent
Fujishiro et al.

(10) Patent No.: US 12,621,745 B2
(45) Date of Patent: May 5, 2026

(54) COMMUNICATION CONTROL METHOD

(71) Applicant: KYOCERA CORPORATION, Kyoto (JP)

(72) Inventors: Masato Fujishiro, Yokohama (JP); Henry Chang, San Diego, CA (US)

(73) Assignee: KYOCERA CORPORATION, Kyoto (JP)

( * ) Notice: Subject to any disclaimer, the term of this patent is extended or adjusted under 35 U.S.C. 154(b) by 329 days.

(21) Appl. No.: 18/346,409

(22) Filed: Jul. 3, 2023

(65) Prior Publication Data

US 2023/0345346 A1 Oct. 26, 2023

Related U.S. Application Data

(63) Continuation of application No. PCT/JP2021/047564, filed on Dec. 22, 2021.

(60) Provisional application No. 63/133,490, filed on Jan. 4, 2021.

(51) Int. Cl.
| | |
|---|---|
| *H04W 40/22* | (2009.01) |
| *H04W 40/24* | (2009.01) |
| *H04W 40/28* | (2009.01) |
| *H04W 72/20* | (2023.01) |

(52) U.S. Cl.
CPC ......... *H04W 40/22* (2013.01); *H04W 40/248* (2013.01); *H04W 40/28* (2013.01); *H04W 72/20* (2023.01)

(58) Field of Classification Search
None
See application file for complete search history.

(56) References Cited

U.S. PATENT DOCUMENTS

| | | | |
|---|---|---|---|
| 11,005,606 | B2 | 5/2021 | Pradas et al. |
| 11,552,745 | B2 | 1/2023 | Pradas et al. |
| 2021/0377980 | A1 | 12/2021 | Fujishiro et al. |
| 2022/0015000 | A1 | 1/2022 | Fujishiro et al. |

(Continued)

FOREIGN PATENT DOCUMENTS

| | | |
|---|---|---|
| JP | 2020-516145 A | 5/2020 |
| WO | 2020/166621 A1 | 8/2020 |
| WO | 2020/196201 A1 | 10/2020 |

OTHER PUBLICATIONS

LG Electronics Inc., "BAP Packet Duplication and BH RLF Indication Enhancements", 3GPP TSG-RAN2 #112e, R2-2010441, Electronic meeting, Nov. 2-13, 2020, total 6 pages.

(Continued)

*Primary Examiner* — Walter J Divito

(74) *Attorney, Agent, or Firm* — Studebaker Brackett PLLC

(57) ABSTRACT

In a first aspect, a communication control method is used in a cellular communication system. The communication control method includes receiving, by a relay node involved between a parent node and a child node, a flow control feedback message from the parent node or the child node. The communication control method includes executing, by the relay node, local rerouting to transfer a data packet to an alternative path, which is different from a path to the parent node or the child node transmitting the flow control feedback message, in response to a certain period elapsing after receiving the flow control feedback message.

3 Claims, 38 Drawing Sheets

(56)                        References Cited

U.S. PATENT DOCUMENTS

2023/0292217  A1*    9/2023  Jung  ...................... H04W 40/14

OTHER PUBLICATIONS

Kyocera, "Consideration of topology adaptation enhancements for eIAB", 3GPP TSG-RAN WG2 #112-e, R2-2010233, Online, Nov. 2 -13, 2020, total 13 pages.

"3rd Generation Partnership Project; Technical Specification Group Radio Access Network; NR; NR and NG-RAN Overall Description; Stage 2"; Release 16; 3GPP TS 38.300 V16.3.0 (Sep. 2020); pp. 1-148.

LG Electronics Inc.; "Consideration on routing enhancement"; 3GPP TSG-RAN WG2 Meeting #111 electronic; R2-2007295; Online; Aug. 17-28, 2020; pp. 1-4.

CATT; "On Remaining Open Issues of IAB Routing"; 3GPP TSG-RAN WG2 Meeting #108; R2-1914385; Reno, USA; Nov. 18-22, 2019; pp. 1-7.

Intel Corporation; "Discussion on Topology-wide fairness and flow control enhancement"; 3GPP TSG RAN WG2 Meeting #112e; R2-2009200; Electronic meeting; Nov. 2-13, 2020; pp. 1-12.

* cited by examiner

START — S10

RECEIVE flow control feedback FROM PARENT NODE OR CHILD NODE — S11

MEASURE CERTAIN PERIOD — S12

EXECUTE local rerouting IN RESPONSE TO ELAPSE OF CERTAIN PERIOD — S13

END — S14

START ～ S40

IAB NODE EXECUTES local rerouting ～ S41

IAB DONOR TAKES PREDETERMINED STATE AS OPPORTUNITY TO TRANSMIT STOP INSTRUCTION OF local rerouting ～ S42

IAB NODE STOPS local rerouting IN RESPONSE TO RECEIVING STOP INSTRUCTION OF local rerouting FROM IAB DONOR ～ S43

END ～ S44

START — S60

IAB NODE, WHEN DETERMINING START OR STOP OF EXECUTING local rerouting, NOTIFIES IAB DONOR. — S61

IAB DONOR MAY GIVE ALLOWING OR PROHIBITING INSTRUCTION. — S62

END — S63

START — S80

IAB NODE EXECUTES local rerouting WHEN MATCHING CERTAIN EXECUTION CONDITION — S81

IAB NODE STOP local rerouting WHEN MATCHING STOPPING CONDITION CORRESPONDING TO EXECUTION CONDITION — S82

END — S83

START ～ S130

IAB DONOR CONFIGURES IAB-donor-DU ADDRESS OF ANOTHER DONOR CONFIGURABLE AS alternative path FOR IAB NODE ～ S131

IAB NODE DETERMINES TO EXECUTE local rerouting. ～ S132

IAB NODE SELECTS alternative path. ～ S133

IAB NODE TRANSFERS PACKET TO SELECTED alternative path. ～ S134

END ～ S135

Figure 32:
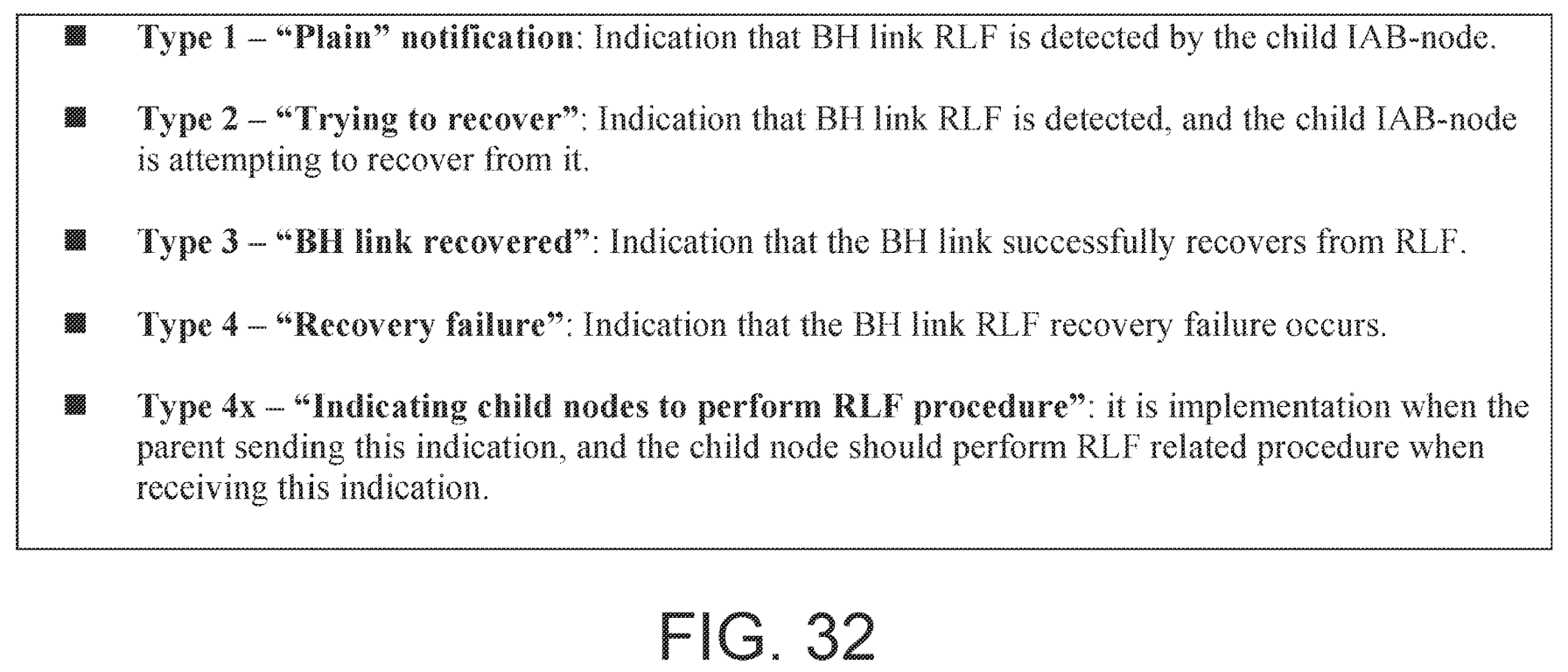

- Type 1 – "Plain" notification: Indication that BH link RLF is detected by the child IAB-node.

- Type 2 – "Trying to recover": Indication that BH link RLF is detected, and the child IAB-node is attempting to recover from it.

- Type 3 – "BH link recovered": Indication that the BH link successfully recovers from RLF.

- Type 4 – "Recovery failure": Indication that the BH link RLF recovery failure occurs.

- Type 4x – "Indicating child nodes to perform RLF procedure": it is implementation when the parent sending this indication, and the child node should perform RLF related procedure when receiving this indication.

*Option 2: Type 2 Indication repetitions*

*Option 1: Type 2 & Type 3 Indications*

FIG. 34

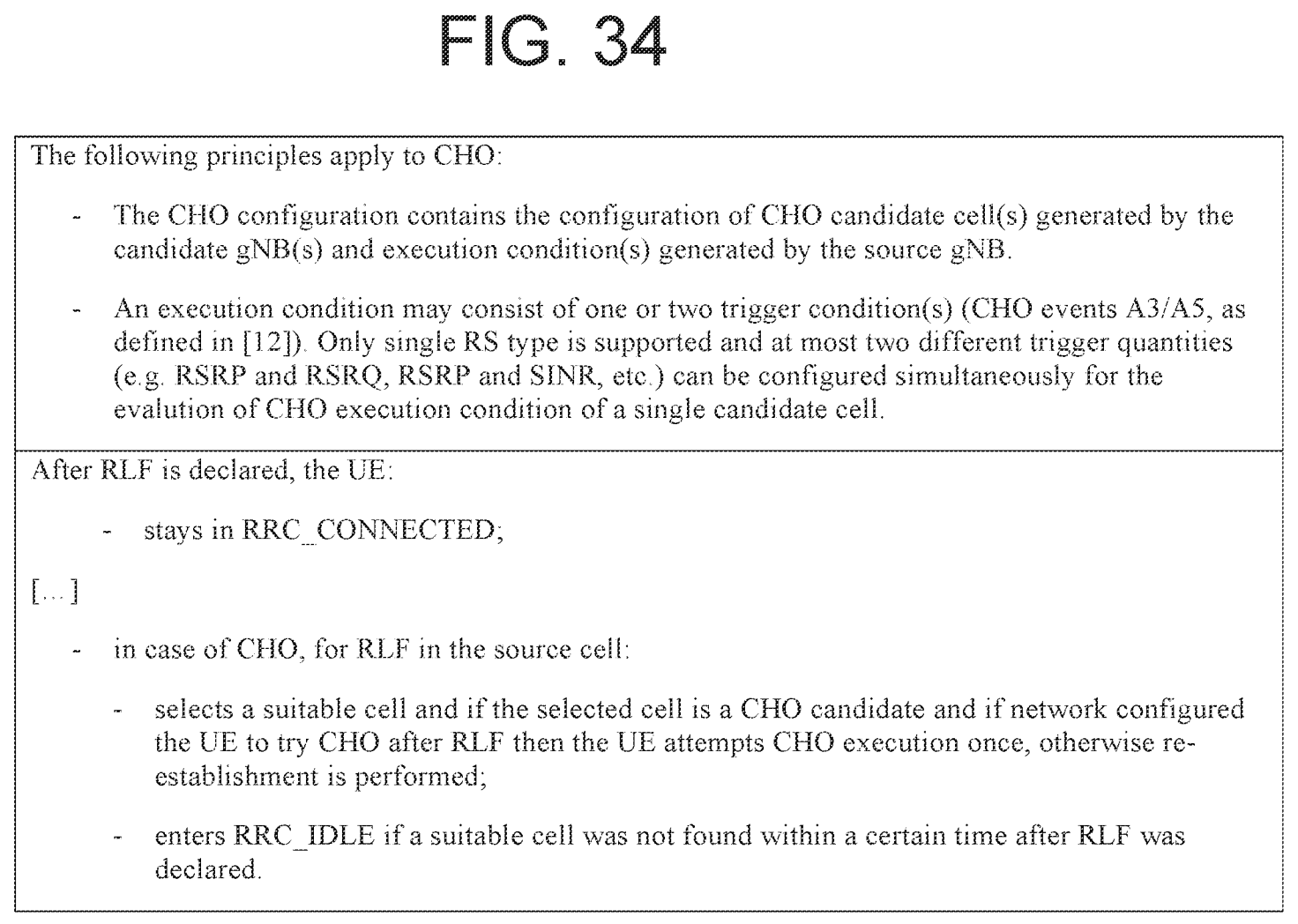

The following principles apply to CHO:

- The CHO configuration contains the configuration of CHO candidate cell(s) generated by the candidate gNB(s) and execution condition(s) generated by the source gNB.

- An execution condition may consist of one or two trigger condition(s) (CHO events A3/A5, as defined in [12]). Only single RS type is supported and at most two different trigger quantities (e.g. RSRP and RSRQ, RSRP and SINR, etc.) can be configured simultaneously for the evaluation of CHO execution condition of a single candidate cell.

After RLF is declared, the UE:

- stays in RRC_CONNECTED;

[...]

- in case of CHO, for RLF in the source cell:

- selects a suitable cell and if the selected cell is a CHO candidate and if network configured the UE to try CHO after RLF then the UE attempts CHO execution once, otherwise re-establishment is performed;

- enters RRC_IDLE if a suitable cell was not found within a certain time after RLF was declared.

Figure 35:
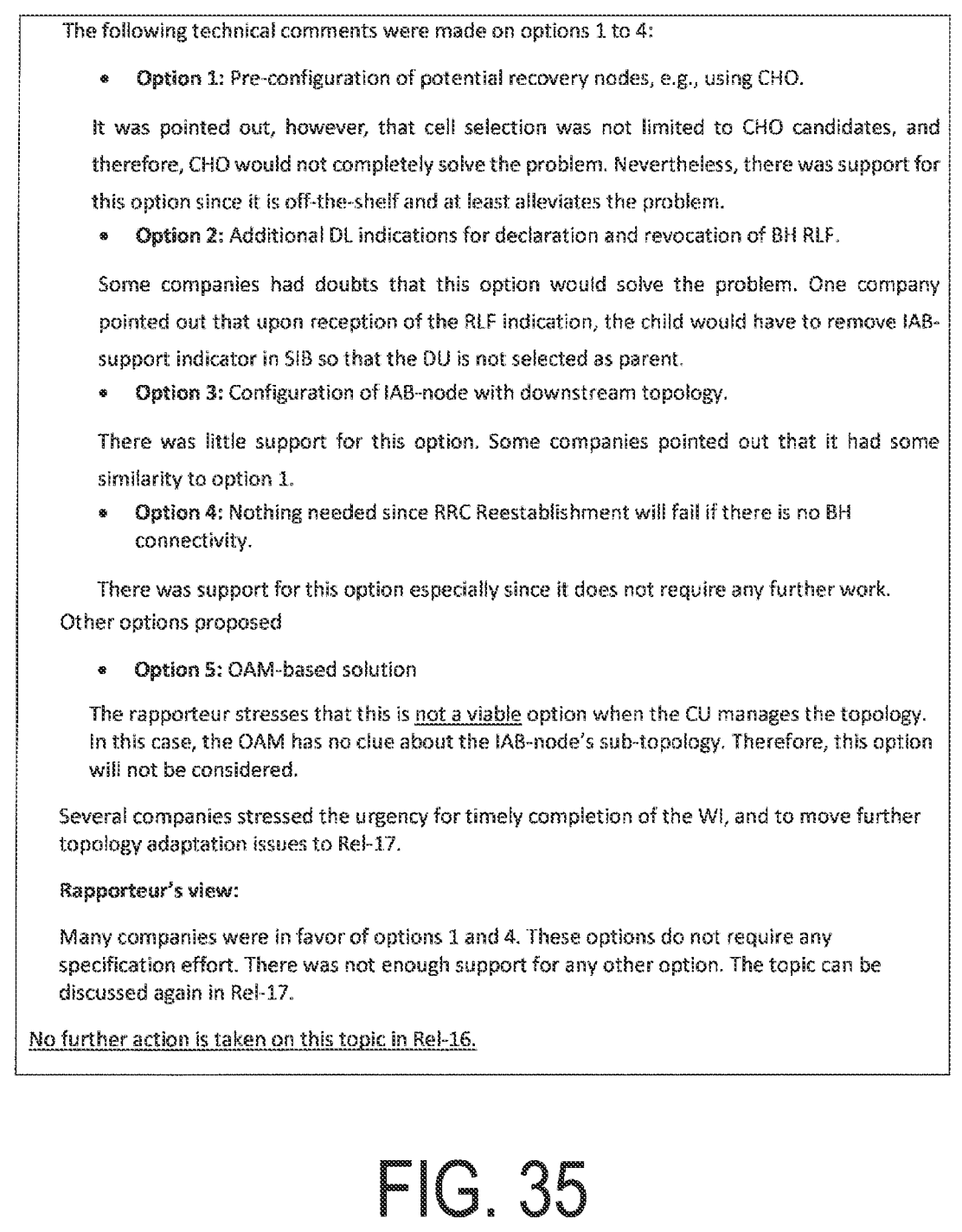

The following technical comments were made on options 1 to 4:

- Option 1: Pre-configuration of potential recovery nodes, e.g., using CHO.

It was pointed out, however, that cell selection was not limited to CHO candidates, and therefore, CHO would not completely solve the problem. Nevertheless, there was support for this option since it is off-the-shelf and at least alleviates the problem.

- Option 2: Additional DL indications for declaration and revocation of BH RLF.

Some companies had doubts that this option would solve the problem. One company pointed out that upon reception of the RLF indication, the child would have to remove IAB-support indicator in SIB so that the DU is not selected as parent.

- Option 3: Configuration of IAB-node with downstream topology.

There was little support for this option. Some companies pointed out that it had some similarity to option 1.

- Option 4: Nothing needed since RRC Reestablishment will fail if there is no BH connectivity.

There was support for this option especially since it does not require any further work.

Other options proposed

- Option 5: OAM-based solution

The rapporteur stresses that this is <u>not a viable</u> option when the CU manages the topology. In this case, the OAM has no clue about the IAB-node's sub-topology. Therefore, this option will not be considered.

Several companies stressed the urgency for timely completion of the WI, and to move further topology adaptation issues to Rel-17.

Rapporteur's view:

Many companies were in favor of options 1 and 4. These options do not require any specification effort. There was not enough support for any other option. The topic can be discussed again in Rel-17.

<u>No further action is taken on this topic in Rel-16.</u>

| | Modification of PDCP protocol/procedures | Rerouting of PDCP PDUs buffered on intermediate IAB-nodes | Introducing UL status delivery |
|---|---|---|---|
| Applicable to Rel-15 UEs | No | Yes | Yes |
| Signaling overhead | Yes<br>New signaling for triggering data retransmission | Yes<br>New signaling for either deciding whether to discard the buffered data or configuring the forwarding path for the buffered data on the old route. | Yes<br>New signaling for confirming data reception and/or triggering data retransmission. |
| Support of lossless delivery of UL data | Yes | No | Yes |

FIG. 37

| Solution | Descriptions |
|---|---|
| C-1 | Access IAB node delays the sending of RLC ACKs to UE until a confirmation of reception at IAB donor [3, 4, 7]. |
| | When PDCP data recovery / PDCP re-establishment is triggered by RRC, UE retransmits all the PDCP SDUs for which the successful delivery has not been confirmed by lower layers as in the current PDCP specification. |
| | C-1 would need UL status report from IAB donor to access IAB node. This could be UE bearer specific due to its end to end nature. |
| C-2 | Access IAB node delays the sending of RLC ACKs to UE until a confirmation of reception at its parent node, and the parent node should also delay the sending of RLC ACKs to its child node until a confirmation of reception at its parent node, and so on [4]. |
| | When PDCP data recovery / PDCP re-establishment is triggered by RRC, UE retransmits all the PDCP SDUs for which the successful delivery has not been confirmed by lower layers as in the current PDCP specification. |
| | C-2 would need some enhancements towards RLC ACK/NACK operation between IAB nodes, e.g. with hop by hop RLC ARQ, BH RLC channels multiplex data from many UEs, potentially being served by different downstream IAB nodes. This may lead to stalling RLC ACKs for some UEs based on data being not confirmed for other UEs. |

COMMUNICATION CONTROL METHOD

RELATED APPLICATIONS

The present application is a continuation based on PCT Application No. PCT/JP2021/047564, filed on Dec. 22, 2021, which claims the benefit of U.S. Provisional Application No. 63/133,490 filed on Jan. 4, 2021. The content of which is incorporated by reference herein in their entirety.

TECHNICAL FIELD

The present disclosure relates to a communication control method used in a cellular communication system.

BACKGROUND OF INVENTION

In the 3GPP (Third Generation Partnership Project), which is a project for the standardization of cellular communication systems, introducing a new relay node referred to as an IAB (Integrated Access and Backhaul) node (for example, see "3GPP TS 38.300 V16.3.0 (2020 September)") is being considered. One or more relay nodes are involved in communication between a base station and a user equipment and perform relay for the communication.

SUMMARY

In a first aspect, a communication control method is used in a cellular communication system. The communication control method includes receiving, by a relay node involved between a parent node and a child node, a flow control feedback message from the parent node or the child node. The communication control method includes executing, by the relay node, local rerouting to transfer a data packet to an alternative path, the alternative path being different from a path to the parent node or the child node transmitting the flow control feedback message, in response to a certain period elapsing after receiving the flow control feedback message.

In a second aspect, a communication control method is used in a cellular communication system. The communication control method includes attempting, by a relay node involved between a parent node and a child node, to transfer a data packet to the parent node or the child node. The communication control method includes executing, by the relay node, local rerouting to transfer the data packet to an alternative path when the relay node fails to transfer the data packet for a certain period, the alternative path being different from a path to the parent node or the child node.

In a third aspect, a communication control method is used in a cellular communication system. The communication control method includes executing, by a relay node and in response to at least one of a plurality of execution conditions being satisfied, local rerouting to transfer a data packet to an alternative path, the plurality of execution conditions including receiving a flow control feedback message, receiving an occurrence notification of a failure in a backhaul link between the relay node and a different relay node, and failing to transfer the data packet for a certain period, the alternative path being different from a path to the different relay node. The communication control method includes stopping, by the relay node, the local rerouting in response to a stopping condition being satisfied after executing the local rerouting.

In a fourth aspect, a communication control method is used in a cellular communication system. The communication control method includes transmitting, by a donor base station including a first relay node under control of the donor base station, a first message to the first relay node, the first message being related to local rerouting, and performing, by the first relay node, an operation related to the local rerouting in response to receiving the first message.

BRIEF DESCRIPTION OF THE DRAWINGS

FIG. 32 is a diagram illustrating types of BH RLF notifications.

FIG. 33 is a diagram illustrating transmission options for an enhanced BH RLF indication.

FIG. 34 is a diagram related to CHO execution.

FIG. 35 is a diagram illustrating identified solutions for avoiding reestablishment to a descendant node.

FIG. 36 is a diagram illustrating a comparison of mechanisms for lossless delivery of UL data in a case of hop-by-hop RLCARQ.

FIG. 37 is a diagram illustrating options of "C) introduction of UL status delivery".

DESCRIPTION OF EMBODIMENTS

A cellular communication system according to an embodiment is described with reference to the drawings. In the description of the drawings, the same or similar parts are denoted by the same or similar reference signs.

Configuration of Cellular Communication System

First, a configuration example of the cellular communication system according to an embodiment will be described. In an embodiment, a cellular communication system 1 is a 3GPP 5G system. Specifically, a radio access scheme in the cellular communication system 1 is New Radio (NR) being a 5G radio access scheme. Note that Long Term Evolution (LTE) may be at least partially applied to the cellular communication system. A future cellular communication system such as 6G may be applied to the cellular communication system 1.

Figure 1:
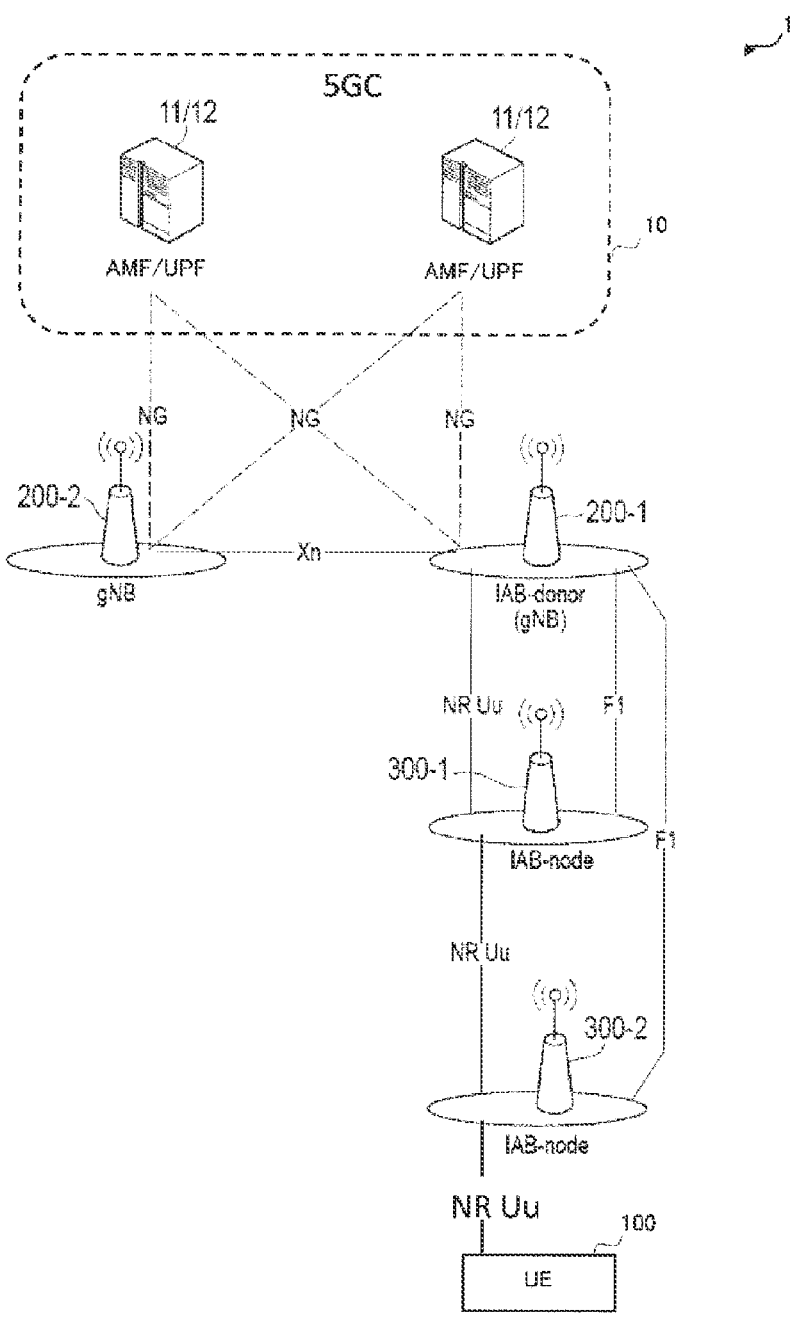
FIG. 1 is a diagram illustrating a configuration example of a cellular communication system according to an embodiment.

FIG. 1 is a diagram illustrating a configuration example of the cellular communication system 1 according to an embodiment.

As illustrated in FIG. 1, the cellular communication system 1 includes a 5G core network (5GC) 10, a User Equipment (UE) 100, base station apparatuses (hereinafter, also referred to as base stations in some cases) 200-1 and 200-2, and IAB nodes 300-1 and 300-2. The base station 200 may be referred to as a gNB.

An example in which the base station 200 is an NR base station is mainly described below, but the base station 200 may also be an LTE base station (i.e., an eNB).

Note that hereinafter, the base stations 200-1 and 200-2 may be referred to as a gNB 200 (or the base station 200 in some cases), and the IAB nodes 300-1 and 300-2 may be referred to as an IAB node 300.

The 5GC 10 includes an Access and Mobility Management Function (AMF) 11 and a User Plane Function (UPF) 12. The AMF 11 is an apparatus that performs various types of mobility controls and the like for the UE 100. The AMF 11 communicates with the UE 100 by using Non-Access Stratum (NAS) signaling, and thereby manages information of an area in which the UE 100 exists. The UPF 12 is an apparatus that performs transfer control of user data and the like.

Each gNB 200 is a fixed wireless communication node and manages one or more cells. The term "cell" is used to indicate a minimum unit of a wireless communication area. The term "cell" may be used to indicate a function or a resource for performing wireless communication with the UE 100. One cell belongs to one carrier frequency.

Each gNB 200 is interconnected to the 5GC 10 via an interface referred to as an NG interface. FIG. 1 illustrates a gNB 200-1 and a gNB 200-2 that are connected to the 5GC 10.

Each gNB 200 may be divided into a Central Unit (CU) and a Distributed Unit (DU). The CU and the DU are interconnected via an interface referred to as an F1 interface. An F1 protocol is a communication protocol between the CU and the DU and includes an F1-C protocol that is a control plane protocol and an F1-U protocol that is a user plane protocol.

The cellular communication system 1 supports an IAB that uses NR for the backhaul to enable wireless relay of the NR access. The donor gNB 200-1 is a donor base station that is a terminal node of the NR backhaul on the network side and includes additional functionality for supporting the IAB. The backhaul can implement multi-hop via a plurality of hops (i.e., a plurality of IAB nodes 300).

FIG. 1 illustrates an example in which an IAB node 300-1 is wirelessly connected to the donor gNB 200-1, an IAB node 300-2 is wirelessly connected to the IAB node 300-1, and the F1 protocol is transmitted via two backhaul hops.

The UE 100 is a mobile wireless communication apparatus that performs wireless communication with the cells. The UE 100 may be any type of apparatus as long as the UE 100 is an apparatus that performs wireless communication with the gNB 200 or the IAB node 300. For example, the UE 100 is a mobile phone terminal, a tablet terminal, a notebook PC, a sensor or an apparatus provided in the sensor, and/or a vehicle or an apparatus provided in the vehicle. The UE 100 is wirelessly connected to the IAB node 300 or the gNB 200 via an access link. FIG. 1 illustrates an example in which the UE 100 is wirelessly connected to the IAB node 300-2. The UE 100 indirectly communicates with the donor gNB 200-1 via the IAB node 300-2 and the IAB node 300-1.

Figure 2:
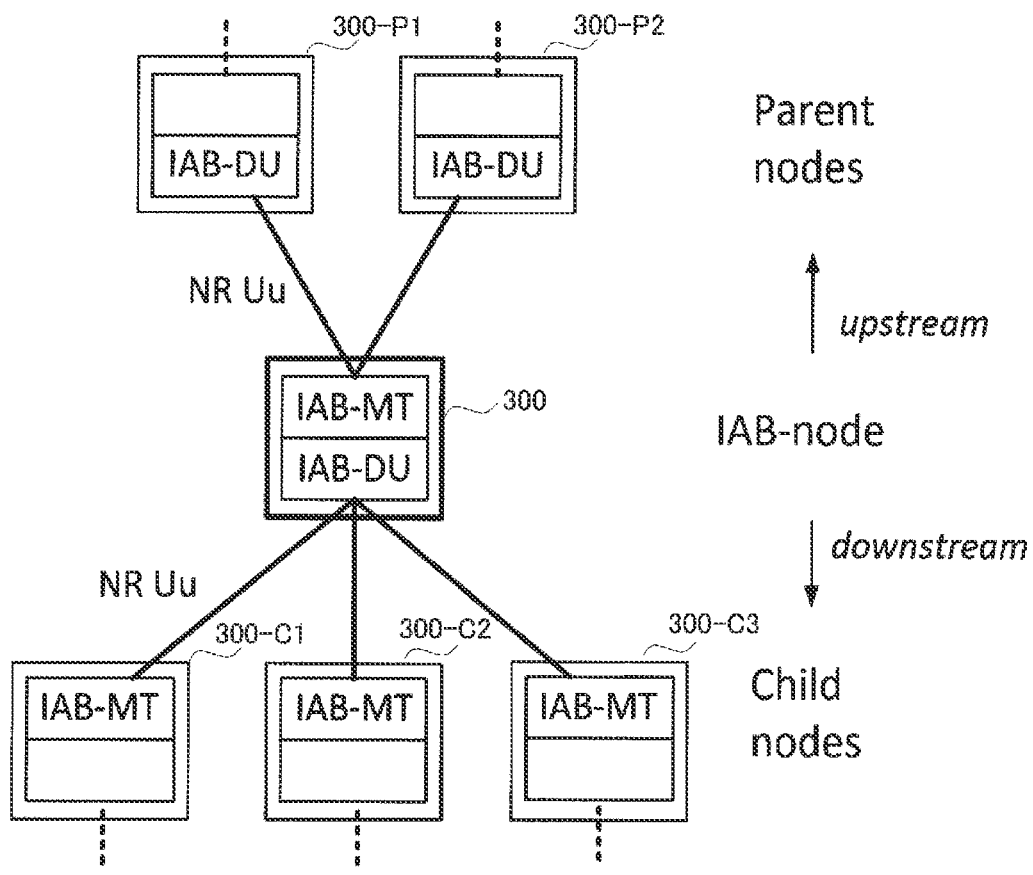
FIG. 2 is a diagram illustrating a relationship between an IAB node, Parent nodes, and Child nodes.

FIG. 2 is a diagram illustrating a relationship between the IAB node 300, Parent nodes, and Child nodes.

As illustrated in FIG. 2, each IAB node 300 includes an IAB-DU corresponding to a base station functional unit and an IAB-Mobile Termination (MT) corresponding to a user equipment functional unit.

Neighboring nodes of the IAB-MT (i.e., upper node) of an NR Uu wireless interface are referred to as "parent nodes". The parent node is the DU of a parent IAB node or the donor gNB 200. A radio link between the IAB-MT and each parent node is referred to as a backhaul link (BH link). FIG. 2 illustrates an example in which the parent nodes of the IAB node 300 are IAB nodes 300-P1 and 300-P2. Note that the direction toward the parent nodes is referred to as upstream. As viewed from the UE 100, the upper nodes of the UE 100 can correspond to the parent nodes.

Neighboring nodes of the IAB-DU (i.e., lower nodes) of an NR access interface are referred to as "child nodes". The IAB-DU manages cells in a manner the same as, and/or similar to the gNB 200. The IAB-DU terminates the NR Uu wireless interface connected to the UE 100 and the lower IAB nodes. The IAB-DU supports the F1 protocol for the CU of the donor gNB 200-1. FIG. 2 illustrates an example in which the child nodes of the IAB node 300 are IAB nodes 300-C1 to 300-C3; however, the UE 100 may be included in the child nodes of the IAB node 300. Note that the direction toward the child nodes is referred to as downstream.

Configuration of Base Station

Figure 3:
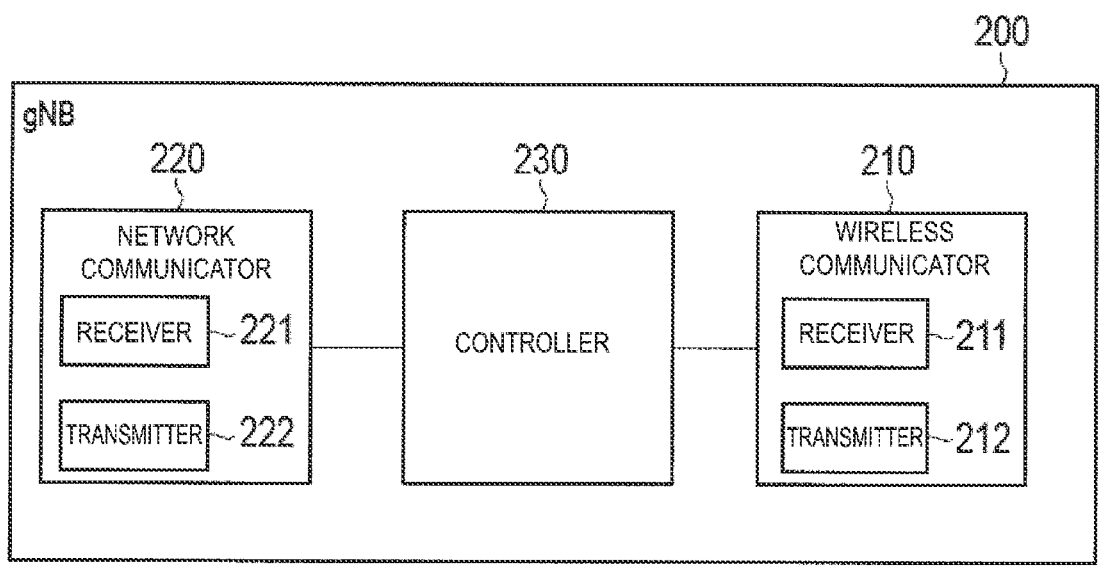
FIG. 3 is a diagram illustrating a configuration example of a gNB (base station) according to an embodiment.

A configuration of the gNB 200 that is a base station according to the embodiment is described. FIG. 3 is a diagram illustrating a configuration example of the gNB 200. As illustrated in FIG. 3, the gNB 200 includes a wireless communicator 210, a network communicator 220, and a controller 230.

The wireless communicator 210 performs wireless communication with the UE 100 and performs wireless communication with the IAB node 300. The wireless communicator 210 includes a receiver 211 and a transmitter 212. The receiver 211 performs various types of reception under control of the controller 230. The receiver 211 includes an antenna and converts (down-converts) a radio signal received by the antenna into a baseband signal (reception signal) which is then transmitted to the controller 230. The transmitter 212 performs various types of transmission under control of the controller 230. The transmitter 212 includes an antenna and converts (up-converts) the baseband signal (transmission signal) output by the controller 230 into a radio signal which is then transmitted from the antenna.

The network communicator 220 performs wired communication (or wireless communication) with the 5GC 10 and performs wired communication (or wireless communication) with another neighboring gNB 200. The network communicator 220 includes a receiver 221 and a transmitter 222. The receiver 221 performs various types of reception under control of the controller 230. The receiver 221 receives a signal from an external source and outputs the reception signal to the controller 230. The transmitter 222 performs various types of transmission under control of the controller 230. The transmitter 222 transmits the transmission signal output by the controller 230 to an external destination.

The controller 230 performs various types of controls for the gNB 200. The controller 230 includes at least one memory and at least one processor electrically connected to the memory. The memory stores a program to be executed by the processor and information to be used for processing by the processor. The processor may include a baseband processor and a Central Processing Unit (CPU). The baseband processor performs modulation and demodulation, coding and decoding, and the like of a baseband signal. The CPU executes the program stored in the memory to thereby perform various types of processing. The processor performs processing of the layers described below. In each example described below, the controller 230 may perform each processing operation in the gNB 200.

Configuration of Relay Node

Figure 4:
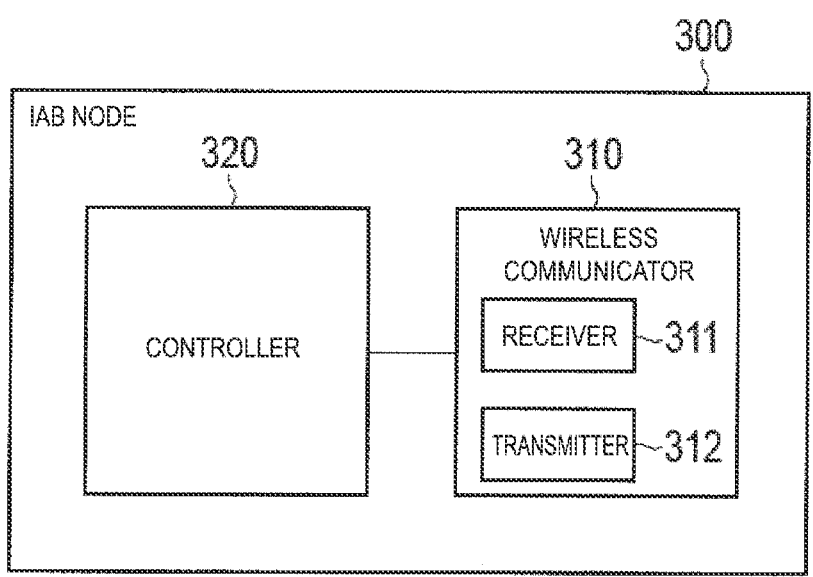
FIG. 4 is a diagram illustrating a configuration example of an IAB node (relay node) according to an embodiment.

A configuration of the IAB node 300 that is a relay node (or a relay node apparatus, which is also referred to as a relay node below in some cases) according to the embodiment is described. FIG. 4 is a diagram illustrating a configuration example of the IAB node 300. As illustrated in FIG. 4, the IAB node 300 includes a wireless communicator 310 and a controller 320. The IAB node 300 may include a plurality of wireless communicators 310.

The wireless communicator 310 performs wireless communication with the gNB 200 (BH link) and wireless communication with the UE 100 (access link). The wireless communicator 310 for the BH link communication and the wireless communicator 310 for the access link communication may be provided separately.

The wireless communicator 310 includes a receiver 311 and a transmitter 312. The receiver 311 performs various types of reception under control of the controller 320. The receiver 311 includes an antenna and converts (down-converts) a radio signal received by the antenna into a baseband signal (reception signal) which is then transmitted to the controller 320. The transmitter 312 performs various types of transmission under control of the controller 320. The transmitter 312 includes an antenna and converts (up-converts) the baseband signal (transmission signal) output by the controller 320 into a radio signal which is then transmitted from the antenna.

The controller 320 performs various types of controls in the IAB node 300. The controller 320 includes at least one memory and at least one processor electrically connected to the memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing. The processor performs processing of the layers described below. In each example described below, the controller 320 may perform each processing operation in the IAB node 300.

Configuration of User Equipment

Figure 5:
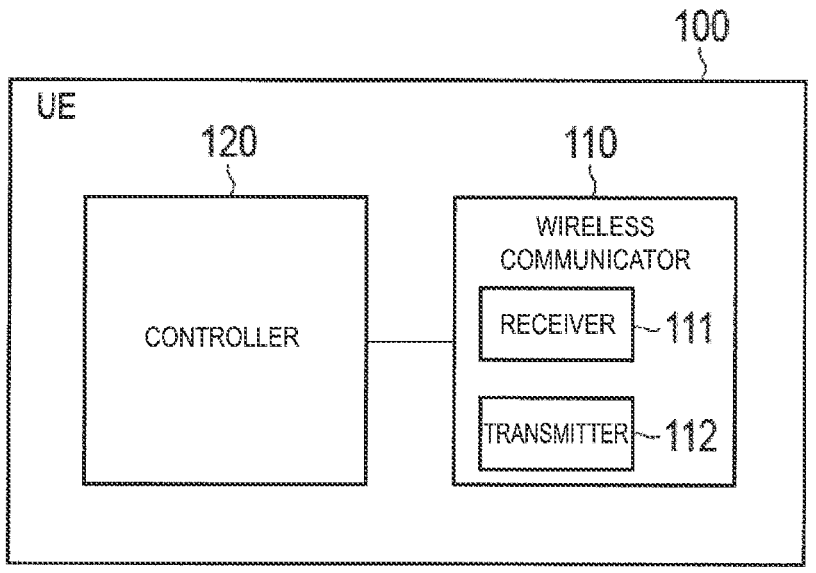
FIG. 5 is a diagram illustrating a configuration example of a UE (user equipment) according to an embodiment.

A configuration of the UE 100 that is a user equipment according to the embodiment is described next. FIG. 5 is a diagram illustrating a configuration example of the UE 100. As illustrated in FIG. 5, the UE 100 includes a wireless communicator 110 and a controller 120.

The wireless communicator 110 performs wireless communication in the access link, i.e., wireless communication with the gNB 200 and wireless communication with the IAB node 300. The wireless communicator 110 may also perform wireless communication in a sidelink, i.e., wireless communication with another UE 100. The wireless communicator 110 includes a receiver 111 and a transmitter 112. The receiver 111 performs various types of reception under control of the controller 120. The receiver 111 includes an antenna and converts (down-converts) a radio signal received by the antenna into a baseband signal (reception signal) which is then transmitted to the controller 120. The transmitter 112 performs various types of transmission under control of the controller 120. The transmitter 112 includes an antenna and converts (up-converts) the baseband signal (transmission signal) output by the controller 120 into a radio signal which is then transmitted from the antenna.

The controller 120 performs various types of control in the UE 100. The controller 120 includes at least one memory and at least one processor electrically connected to the memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing. The processor performs processing of the layers described below. In each example described below, the controller 130 may perform each processing operation in the UE 100.

Configuration of Protocol Stack

Figure 6:
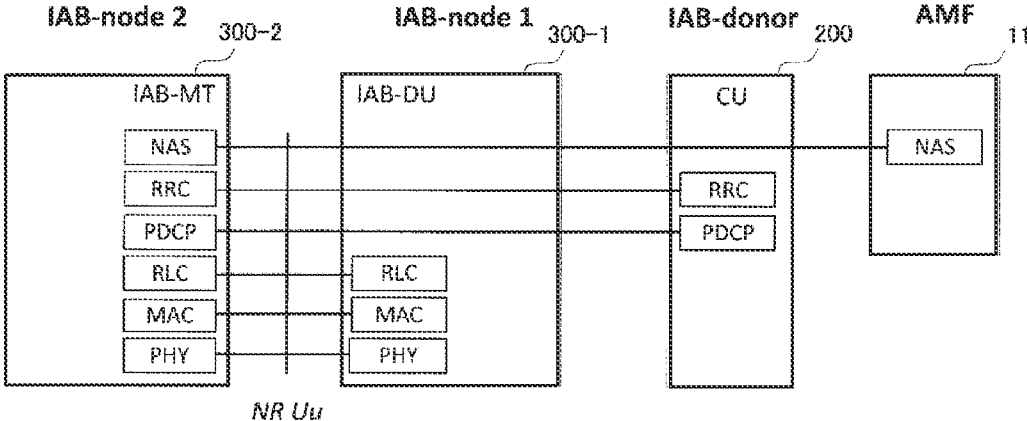
FIG. 6 is a diagram illustrating an example of a protocol stack related to an RRC connection and a NAS connection of an IAB-MT.

A configuration of a protocol stack according to the embodiment is described next. FIG. 6 is a diagram illustrating an example of a protocol stack related to an RRC connection and a NAS connection of the IAB-MT.

As illustrated in FIG. 6, the IAB-MT of the IAB node 300-2 includes a physical (PHY) layer, a Medium Access Control (MAC) layer, a Radio Link Control (RLC) layer, a Packet Data Convergence Protocol (PDCP) layer, a Radio Resource Control (RRC) layer, and a Non-Access Stratum (NAS) layer.

The PHY layer performs coding and decoding, modulation and demodulation, antenna mapping and demapping, and resource mapping and demapping. Data and control information are transmitted between the PHY layer of the IAB-MT of the IAB node 300-2 and the PHY layer of the IAB-DU of the IAB node 300-1 via a physical channel.

The MAC layer performs priority control of data, retransmission processing through hybrid ARQ (HARQ: Hybrid Automatic Repeat reQuest), a random access procedure, and the like. Data and control information are transmitted between the MAC layer of the IAB-MT of the IAB node 300-2 and the MAC layer of the IAB-DU of the IAB node 300-1 via a transport channel. The MAC layer of the IAB-DU includes a scheduler. The scheduler determines the transport format (transport block size, modulation and coding scheme (MCS)) and the assignment of resource blocks in the uplink and the downlink.

The RLC layer transmits data to the RLC layer on the reception side by using functions of the MAC layer and the PHY layer. Data and control information are transmitted between the RLC layer of the IAB-MT of the IAB node 300-2 and the RLC layer of the IAB-DU of the IAB node 300-1 via a logical channel.

The PDCP layer performs header compression and decompression, and encryption and decryption. Data and control information are transmitted between the PDCP layer of the IAB-MT of the IAB node 300-2 and the PDCP layer of the donor gNB 200 via a radio bearer.

The RRC layer controls a logical channel, a transport channel, and a physical channel according to establishment, reestablishment, and release of a radio bearer. RRC signaling for various configurations is transmitted between the RRC layer of the IAB-MT of the IAB node 300-2 and the RRC layer of the donor gNB 200. When an RRC connection to the donor gNB 200 is present, the IAB-MT is in an RRC connected state. When no RRC connection to the donor gNB 200 is present, the IAB-MT is in an RRC idle state.

The NAS layer which is higher than the RRC layer performs session management, mobility management, and the like. NAS signaling is transmitted between the NAS layer of the IAB-MT of the IAB node 300-2 and the AMF 11.

Figure 7:
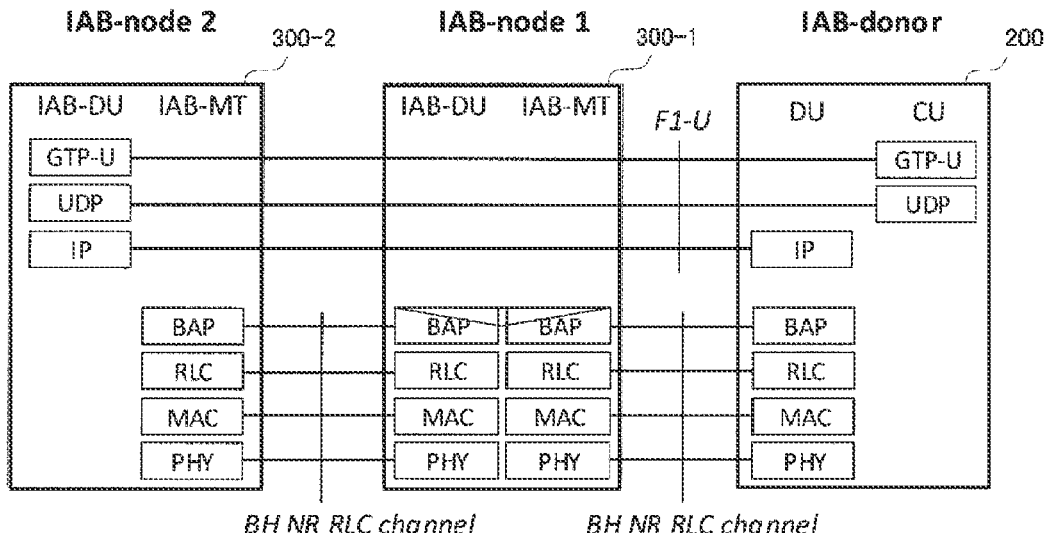
FIG. 7 is a diagram illustrating an example of a protocol stack related to an F1-U protocol.
Figure 8:
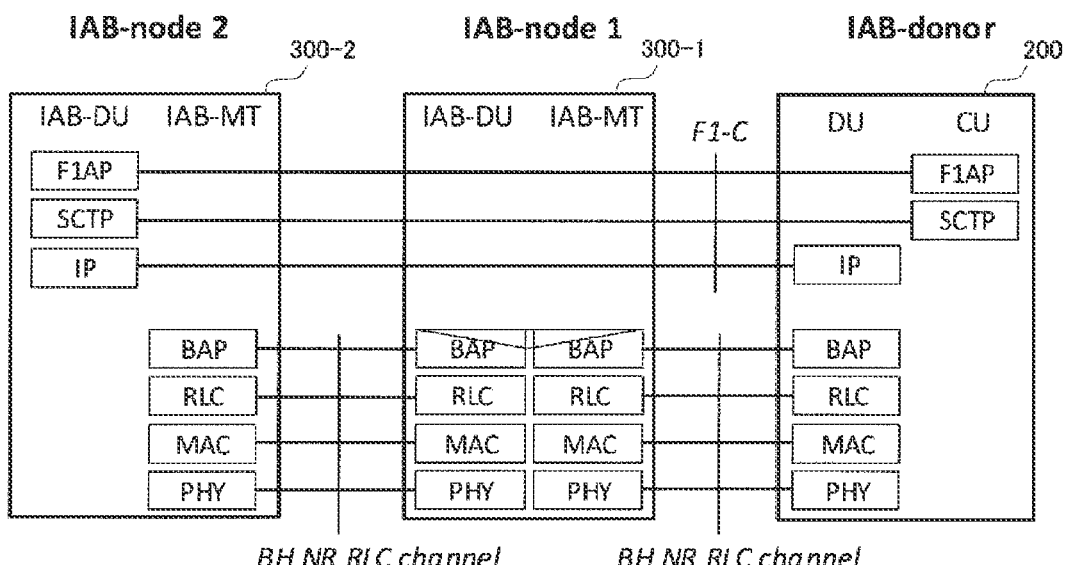
FIG. 8 is a diagram illustrating an example of a protocol stack related to an F1-C protocol.

FIG. 7 is a diagram illustrating a protocol stack related to an F1-U protocol. FIG. 8 is a diagram illustrating a protocol stack related to an F1-C protocol. An example in which the donor gNB 200 is divided into the CU and the DU is illustrated.

As illustrated in FIG. 7, each of the IAB-MT of the IAB node 300-2, the IAB-DU of the IAB node 300-1, the IAB-MT of the IAB node 300-1, and the DU of the donor gNB 200 includes a Backhaul Adaptation Protocol (BAP) layer as a higher layer than the RLC layer. The BAP layer performs routing processing, and bearer mapping and demapping processing. In the backhaul, the IP layer is transmitted via the BAP layer to allow routing through a plurality of hops.

In each backhaul link, a Protocol Data Unit (PDU) of the BAP layer is transmitted by the backhaul RLC channel (BH NR RLC channel). Each BH link include multiple backhaul RLC channels. This enables the prioritization and Quality of Service (QoS) control of traffic. The association between the BAP PDU and the backhaul RLC channel is executed by the BAP layer of each IAB node 300 and the BAP layer of the donor gNB 200.

As illustrated in FIG. 8, the protocol stack of the F1-C protocol includes an F1AP layer and a Stream Control Transmission Protocol (SCTP) layer, instead of a GTP-U layer and a UDP layer illustrated in FIG. 7.

Note that in the description below, processing or operation performed by the IAB-DU and the IAB-MT of the IAB may be simply described as processing or operation of the "IAB". For example, in the description, transmitting, by the IAB-DU of the IAB node 300-1, a message of the BAP layer to the IAB-MT of the IAB node 300-2 is assumed to correspond to transmitting, by the IAB node 300-1, the message to the IAB node 300-2. Processing or operation of the DU or CU of the IAB donor 200 may be described simply as processing or operation of the "IAB donor".

An upstream direction and an uplink (UL) direction may be used without distinction. A downstream direction and a downlink (DL) direction may be used without distinction.

In the description below, the donor gNB 200 may be referred to as the IAB donor 200 in some cases.

First Embodiment

In the cellular communication system 1, the flow control may be performed. The flow control can avoid congestion (or being crowded, hereinafter, also referred to as "crowding" in some cases) associated with packet drops in the IAB node 300 and the IAB donor 200.

The flow control in the downstream direction in the 3GPP is supported in the BAP sublayer. The IAB node 300 transmits feedback information related to a buffer size available in each ingress (inflow) BH RLC channel to the parent node when a buffer size exceeds a certain volume or upon receiving a flow control polling. The feedback information is transmitted using a BAP Control PDU.

The flow control in the upstream direction, in the 3GPP, is not particularly defined, and performed by UL scheduling (or UL grant) on the MAC layer depending on the implementation.

On the other hand, in the cellular communication system 1, local rerouting may be performed in some cases. In the 3GPP, the local rerouting is such that when a line failure in a backhaul link (BH RLF (Backhaul Radio Link Failure)) occurs, a data packet is transferred via an alternative path. Generally, the IAB donor 200 makes a routing configuration for each IAB node 300. Then, each IAB node 300 selects a relay node to transfer the data packet from a plurality of relay nodes in accordance with the routing configuration. The local rerouting may be performed by selecting an alternative path, as described above, ignoring such routing configurations.

The flow control and the local rerouting described above may be combined to perform control as described below in some cases. Specifically, the IAB node 300, upon receiving an uplink flow control feedback (UL Flow control feedback) message from the parent node, performs the local rerouting. In other words, when the IAB node 300 receives the message from the parent node, the IAB node 300 selects an alternative path and transfers the data packet to another parent node on the alternative path.

However, if the IAB node 300 receives the uplink flow control feedback message and immediately performs the local rerouting, the data packet may be transferred to the alternative path even though a crowding situation of the parent node to which the message has been transmitted improves, in some cases.

In the first embodiment, first, a relay node (for example, the IAB node 300) involved between a parent node and a child node receives a flow control feedback message from the parent node or the child node. Second, the relay node executes local rerouting to transfer a data packet to an alternative path, the alternative path being different from a path to the parent node or the child node transmitting the flow control feedback message, in response to a certain period elapsing after receiving the flow control feedback message.

This allows the IAB node 300 to refer to the crowding situation of the parent node or the child node for a certain period even though receiving a flow control feedback message, for example. Therefore, when the crowding situation is improved, the IAB node 300 can maintain the path to the parent node before a certain period elapses.

Figure 9:
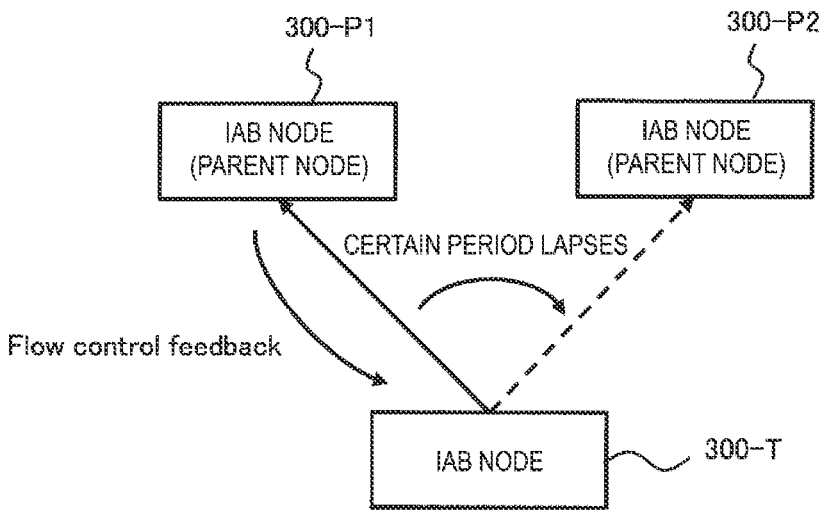
FIG. 9 is a diagram illustrating an example of local rerouting in a first embodiment.

FIG. 9 is a diagram illustrating an example of local rerouting when an IAB node 300-T receives a flow control feedback message from the IAB node 300-P1 that is a parent node. As illustrated in FIG. 9, the IAB node 300-T receives the message from the IAB node 300-P1 and transfers the data packet to the IAB node 300-P2 that is another parent node on the alternative path, after a certain period elapses. Note that the flow control feedback message in this case is an uplink flow control feedback message.

Figure 10:
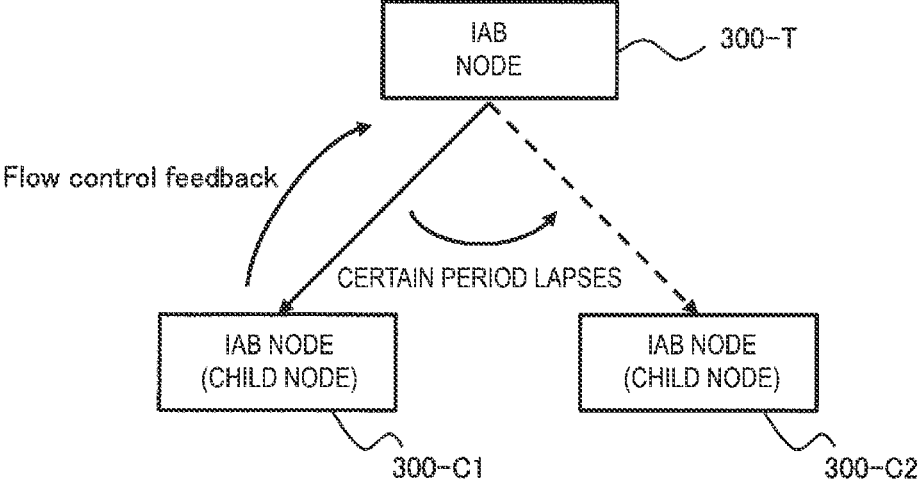
FIG. 10 is a diagram illustrating an example of the local rerouting in the first embodiment.

FIG. 10 is a diagram illustrating an example of the local rerouting when the IAB node 300-T receives a flow control feedback message from the IAB node 300-C1 that is a child node. As illustrated in FIG. 10, the IAB node 300-T receives the message from the IAB node 300-C1 and transfers the data packet to the IAB node 300-C2 that is another child node on the alternative path, after a certain period elapses. Note that the flow control feedback message in this case is a downlink flow control feedback (DL Flow control feedback) message.

Note that the flow control feedback message may be transmitted as a message of the BAP layer such as a BAP Control PDU. Alternatively, a MAC CE and/or an RRC message may be used for the flow control feedback message.

Figure 11:
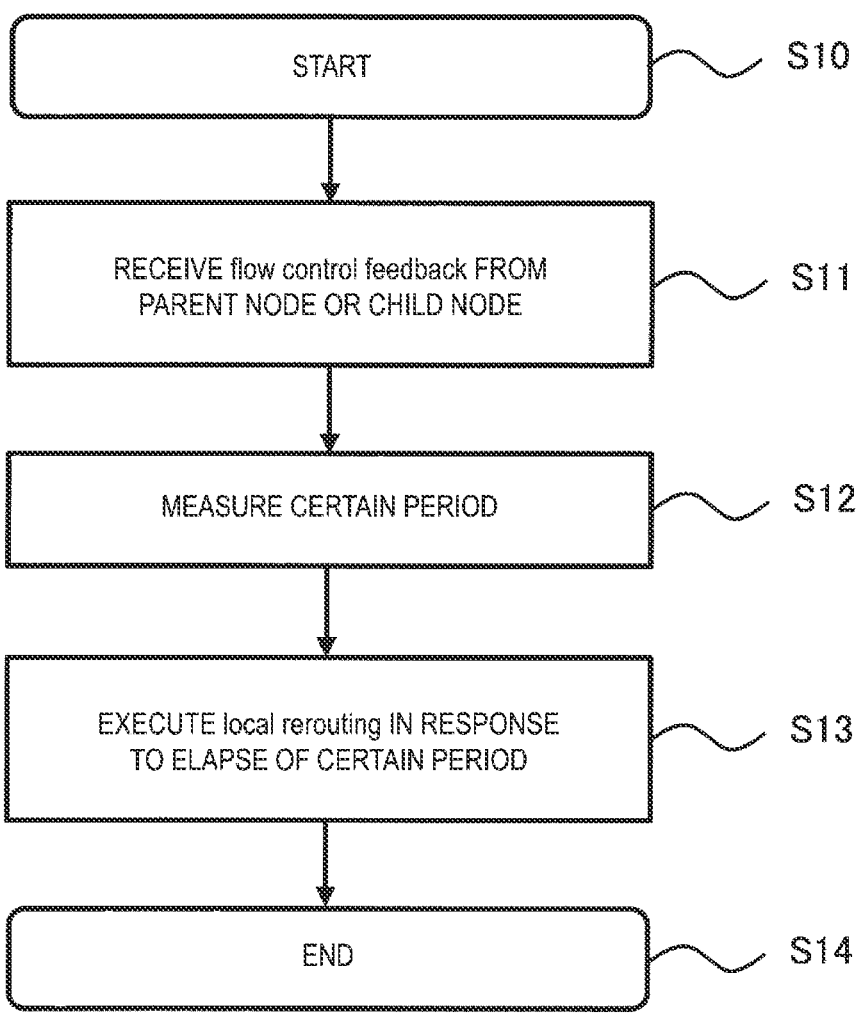
FIG. 11 is a diagram illustrating an operation example of the first embodiment.

FIG. 11 is a diagram illustrating an operation example in the first embodiment.

The IAB node 300-T starts processing in step S10, and then, receives a flow control feedback message from the parent node 300-P1 or the child node 300-C1 in step S11.

In step S12, the IAB node 300-T measures a certain period. A certain period is a period from when the IAB node 300-T receives the flow control feedback message. For example, the IAB node 300-T, upon receiving the message, starts a timer to measure a certain period. The certain period may be configured in advance by the IAB donor 200 or the parent node 300-P1 or may be included in the flow control feedback message. The IAB node 300-T makes a timer to count, and when a count value thereof reaches a certain period, the IAB node 300-T determines that the certain period expires and the certain period elapses. Alternatively, the IAB node 300-T may use the number of times receiving the flow control feedback message to measure the certain period. In other words, the IAB node 300-T increments the counter upon receiving the flow control feedback message from the parent node 300-P1 or the child node 300-C1. When the counter value reaches a threshold, the IAB node 300-T determines that the certain period elapses. The threshold may be preset by the IAB donor 200 or the parent node 300-P1 or may be included in the flow control feedback message. Alternatively, the IAB node 300-T may combine the determination with the timer and the determination with the counter to measure the certain period. Specifically, the IAB node 300-T starts the timer when first receiving the flow control feedback message, and increments the counter. When the counter value reaches the threshold before the timer expires, the IAB node 300-T determines that the certain period elapses. When the timer expires, the IAB node 300-T resets the counter value (i.e., sets to 0).

In step S13, the IAB node 300-T executes the local rerouting in response to the certain period elapsing.

In other words, the IAB node 300-T receives the flow control feedback message from the parent node 300-P1 and transfers the data packet to an alternative path different from a path to the parent node 300-P1 after a certain period elapses. This alternative path is the same alternative path as when a destination of the data packet is the path to the parent node 300-P1. The IAB node 300-T receives the flow control feedback message from the child node 300-C1 and transfers the data packet to an alternative path different from a path to the child node 300-C1 after a certain period elapses. This alternative path is the same alternative path as when a destination of the data packet is the path to the child node 300-C1. The local rerouting may include processing of selecting the alternative path and/or transmitting the packet to the alternative path.

In step S14, the IAB node 300-T terminates a series of processing operations.

Note that in the first embodiment, the IAB node 300-T, upon receiving the downlink flow control feedback message from the child node 300-C1, may execute the local rerouting without a certain period elapsing.

In the first embodiment, instead of the flow control feedback message, Type 1 Indication, Type 2 Indication, or Type 1/2 Indication of the BH RLF may be used.

The Type 1 Indication is an example of a failure occurrence notification indicating detection of a BH RLF (RLF detected). The Type 2 Indication is an example of the failure occurrence notification indicating that recovery from the BH RLF is being attempted (Trying to recover). Further, the Type 1/2 Indication is also an example of the failure occurrence notification, and a notification used when not distinguishing between the Type 1 Indication and the Type 2 Indication.

Note that types of notification include Type 3 Indication (RLF recovered) and Type 4 Indication (Recovery failure). The Type 3 Indication is a recovery notification indicating that the IAB node 300-T has recovered from the BH RLF. The Type 4 Indication is an example of a recovery failure notification indicating that the IAB node 300-T has failed in recovery from the BH RLF.

In the first embodiment, determination on executing the local rerouting may be performed in response to a demand from the parent node 300-P1 or the child node 300-C1, instead of measuring the certain period. For example, the parent node 300-P1 or the child node 300-C1 includes in the flow control feedback message an identifier indicating whether local rerouting is to be performed. The IAB node 300-T determines whether to perform the local rerouting according to the identifier. Thus, the parent node 300-P1 or the child node 300-C1 can control the local rerouting of the IAB node 300-T in accordance with the crowding situation.

Second Embodiment

A second embodiment is an example in which local rerouting is executed when the IAB node 300 fails to transfer a data packet to the parent node or the child node for a certain period, for example.

Specifically, first, a relay node (for example, the IAB node 300) involved between the parent node and the child node attempts to transfer a data packet to the parent node or the child node. Second, the relay node executes the local rerouting to transfer the data packet to an alternative path when the relay node fails to transfer the data packet for a certain period, the alternative path being different from a path to the parent node or the child node.

As a result, for example, the IAB node 300 can give up the current parent node or child node and transmit the data packet to the alternative path so that latency due to the data packet transfer can be reduced.

Figure 12:
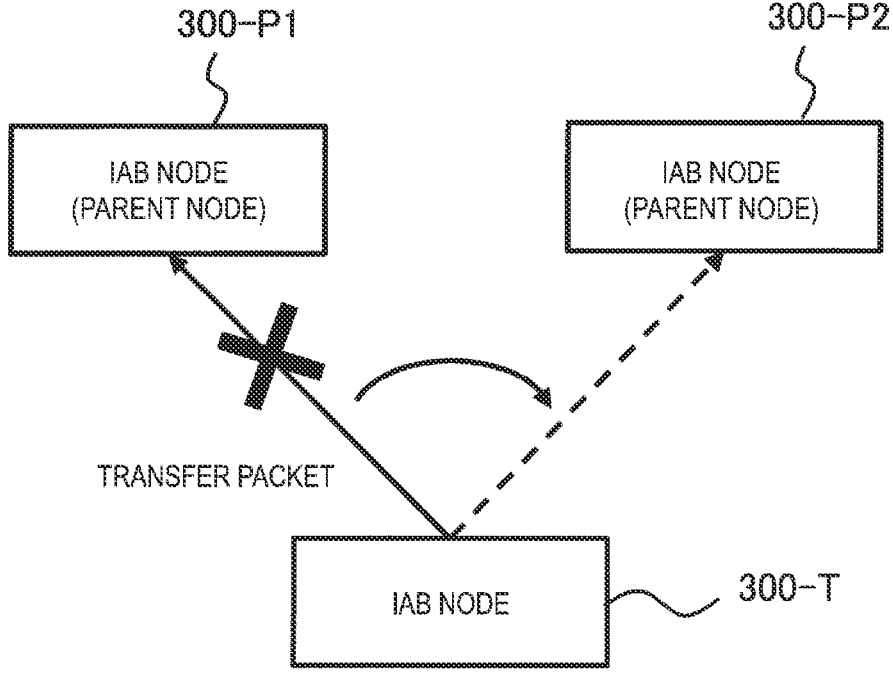
FIG. 12 is a diagram illustrating an example of local rerouting in a second embodiment.

FIG. 12 is a diagram illustrating an example of the local rerouting in the upstream direction for the IAB node 300-T. The IAB node 300-T executes the local rerouting when the IAB node 300-T fails to transfer the data packet to the IAB node 300-P1 that is the parent node for a certain period. Specifically, the IAB node 300-T transfers the data packet to the IAB node 300-P2 on an alternative path different from a path to the IAB node 300-P1.

Figure 13:
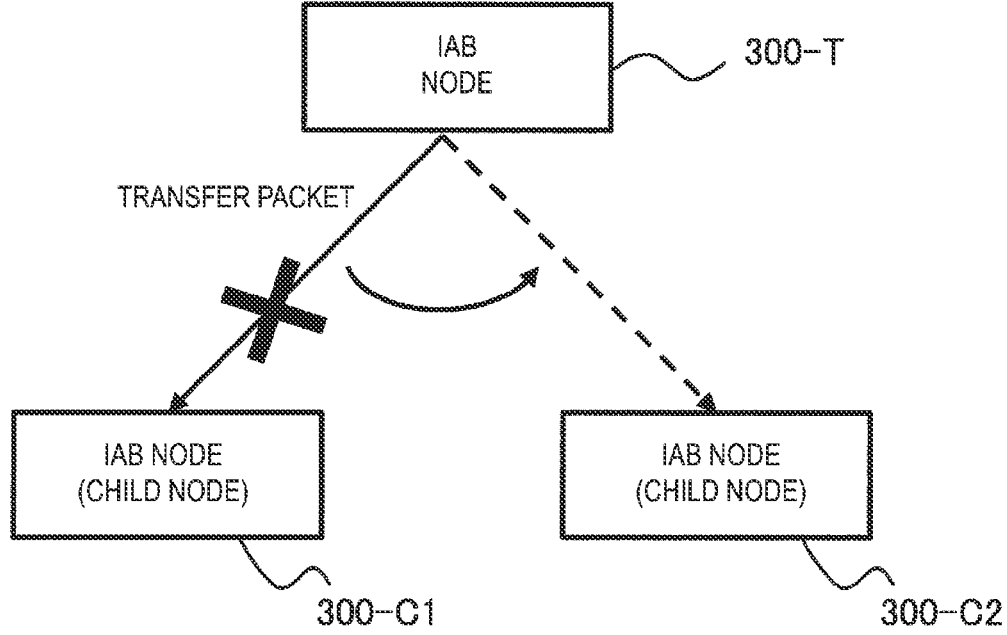
FIG. 13 is a diagram illustrating an example of the local rerouting in the second embodiment.

FIG. 13 is a diagram illustrating an example of the local rerouting in the downstream direction for the IAB node 300-T. The IAB node 300-T executes the local rerouting when the IAB node 300-T fails to transfer the data packet to the IAB node 300-C1 that is the child node for a certain period. Specifically, the IAB node 300-T transfers the data packet to the IAB node 300-C2 on an alternative path different from a path to the IAB node 300-C1.

Figure 14:
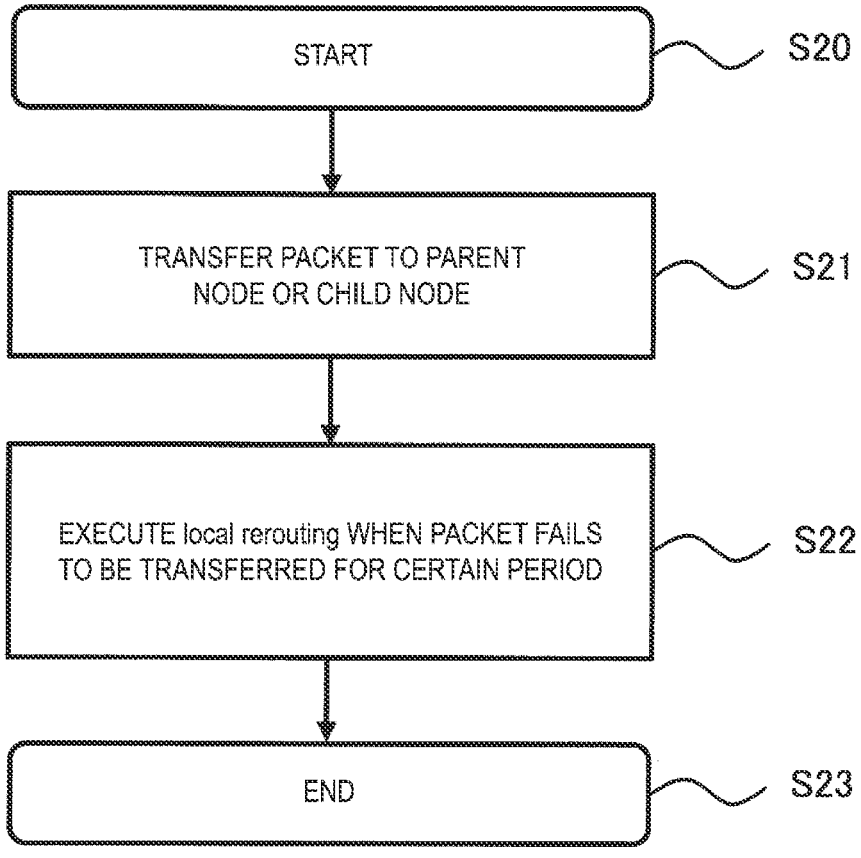
FIG. 14 is a diagram illustrating an operation example in the second embodiment.

FIG. 14 is a diagram illustrating an operation example in the second embodiment.

The IAB node 300-T starts processing in step S20, and then, transfers the data packet to the parent node 300-P1 or the child node 300-C1 in step S21.

In step S22, the IAB node 300-T executes the local rerouting when failing to transfer the data packet for a certain period.

Here, examples of "when failing to transfer the data packet for a certain period" include the following, for the UL direction.

Specifically, (A1) An example of "when failing to transfer the data packet for a certain period" is that the IAB node 300-T does not receive a UL grant from the parent node 300-P1 even if the IAB node 300-T transmits a certain number of times of Scheduling Requests (SRs) to the parent node 300-P1.

(A2) Alternatively, an example of "when failing to transfer the data packet for a certain period" is that the IAB node 300-T does not receive a UL grant for a certain time period after transmitting an SR or a buffer status report (BSR) to the parent node 300-P1.

(A3) Alternatively, an example of "when failing to transfer the data packet for a certain period" is that the number of HARQ/RLC retransmissions of the IAB node 300-T to the parent node 300-P1 reaches a certain number of times. However, in this case, even when the number of HARQ/RLC retransmissions reaches a certain number of times, it is desirable before an RLF occurs.

(A4) Alternatively, an example of "when failing to transfer the data packet for a certain period" is that a radio state (RSRP (Reference Signal Received Power)/RSRQ (Reference Signal Received Quality)) between the IAB node 300-T and the parent node 300-P1 is below a certain value. However, even when the radio state is below a certain value, it is desirable before the RLF occurs.

(A5) Alternatively, an example of "when failing to transfer the data packet for a certain period" is that the IAB node 300-T fails to transfer a data packet to the parent node 300-P1 for a certain period (or the data packet is retained) after receiving the data packet from the child node 300-C1.

Examples of "when failing to transfer the data packet for a certain period" include the following, for the DL direction.

Specifically, (B1) An example of "when failing to transfer the data packet for a certain period" is that the number of HARQ/RLC retransmissions of the IAB node 300-T to the child node 300-C1 reaches a certain number of times.

(B2) Alternatively, an example of "when failing to transfer the data packet for a certain period" is that the radio state between the IAB node 300-T and the child node 300-C1 is below a certain value. The radio state in this case is notified to the IAB node 300-T by a measurement report from the child node 300-C1.

(B3) Alternatively, an example of "when failing to transfer the data packet for a certain period" is that the IAB node 300-T fails to transfer the data packet received from the parent node 300-P1 to the child node 300-C1 (the data packet is retained) for a certain time period.

Note that the "certain number of times", the "certain time period", and the "certain value" in (A1) to (B3) may be configured by the parent node 300-P1 or the IAB donor 200. The IAB node 300-T may measure the "certain time period" using an internal timer. Furthermore, the "certain number of times", the "certain time period", the "certain value", and the timer may exist or be measured separately for each BH RLC channel, for each Logical Channel Group (LCG), for each source and/or destination, or for each routing ID. The timer value may be associated with the BH RLC channel or the like.

Third Embodiment

The first embodiment describes the example in which the IAB node 300 receives a flow control feedback message and performs local rerouting after a certain period elapses. In this case, when the IAB node 300 receives a flow control leaving feedback message, the IAB node 300 can stop executing the local rerouting. The flow control leaving feedback message is a message for notifying that the IAB node 300 having transmitted the message returns from the congestion state to a normal state in which the IAB node 300 is not congested.

On the other hand, in the second embodiment, the IAB node determines by itself to execute the local rerouting.

The third embodiment is an embodiment regarding how to stop the local rerouting when the local rerouting is executed by the IAB node 300 in the second embodiment.

In other words, the relay node (for example, the IAB node 300) stops the local rerouting in response to a certain period elapse after executing the local rerouting. This allows, for example, the IAB node 300 to stop the local rerouting that the IAB node 300 has determined by itself to start to execute.

Figure 15:
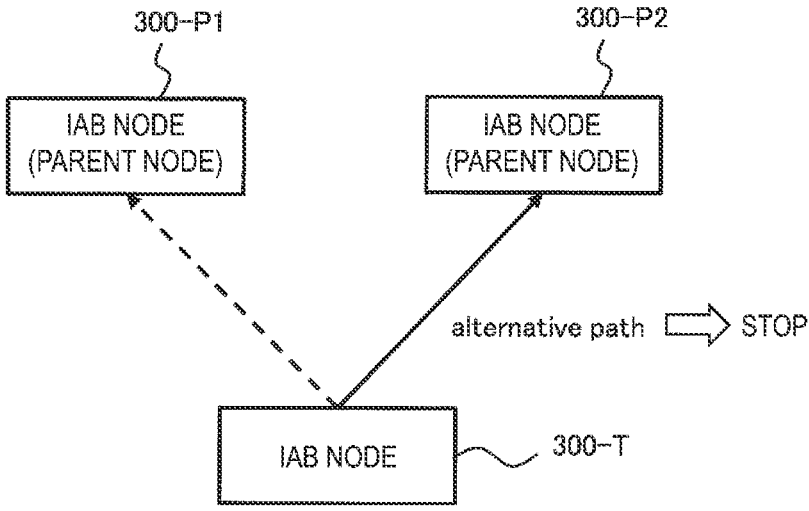
FIG. 15 is a diagram illustrating an example of local rerouting in a third embodiment.

FIG. 15 is a diagram illustrating an example when the local rerouting is executed in the upstream direction. As illustrated in FIG. 15, the IAB node 300-T performs the local rerouting in which the data packet is transferred to the IAB node 300-P2 on the alternative path. The IAB node 300-T stops the local rerouting after executing the local rerouting for a certain period.

Figure 16:
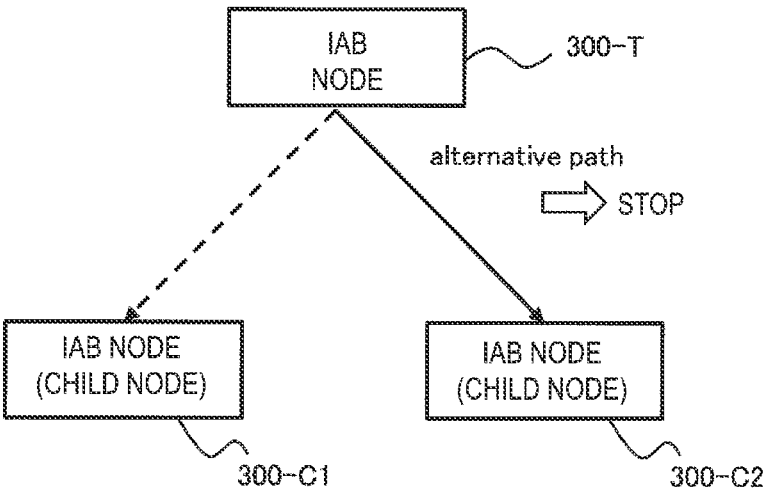
FIG. 16 is a diagram illustrating an example of the local rerouting in the third embodiment.

FIG. 16 is a diagram illustrating an example when the local rerouting is executed in the downstream direction. Also in this case, the IAB node 300-T stops the local rerouting after executing the local rerouting to the IAB node 300-C2 for a certain period.

Figure 17:
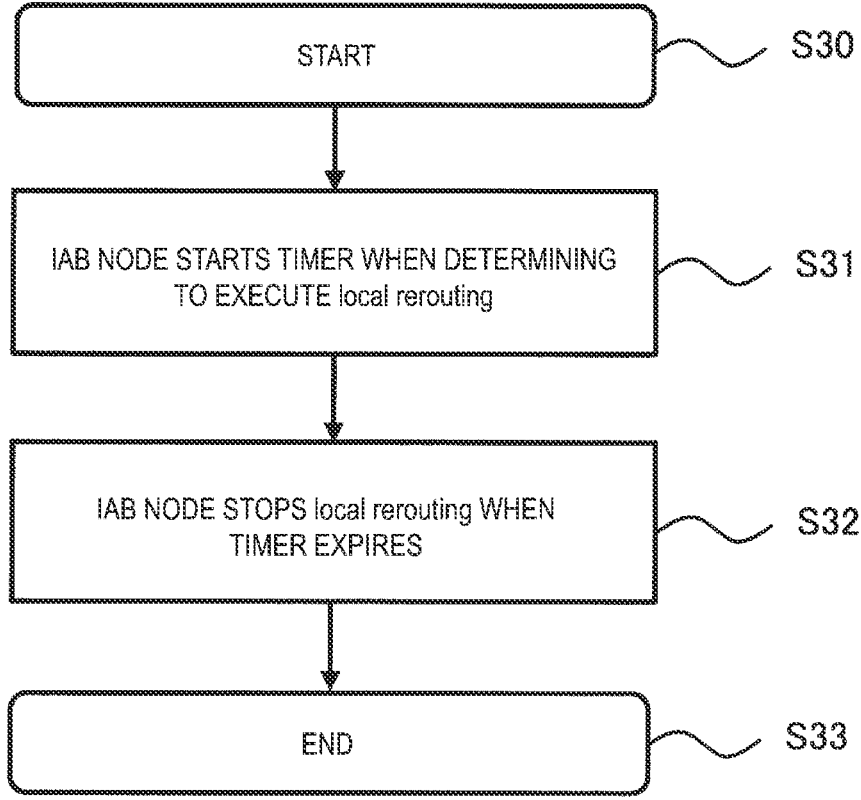
FIG. 17 is a diagram illustrating an operation example in the third embodiment.

FIG. 17 is a diagram illustrating an operation example in the third embodiment.

The IAB node 300-T starts processing in step S30, and then, starts counting by a timer from the time when determining to execute the local rerouting in step S31. In other words, while the timer is running, the local rerouting is executed. Then, the timer of the IAB node 300-T counts the count value until the count value reaches a predetermined timer value. The predetermined timer value may be configured for the IAB node 300-T by, for example, the parent node 300-P1 (or the parent node 300-P2) or the IAB donor 200. The predetermined timer value may be configured for each alternative path.

In step S32, the IAB node 300-T stops the local rerouting when the count value reaches the predetermined timer value, i.e., when the timer expires. To be more specific, the IAB node 300-T attempts to transfer the data packet to the path in accordance with the routing configuration, for example, to the path to the parent node 300-P1 or child node 300-C1 in the examples of FIGS. 15 and 16.

Fourth Embodiment

The IAB donor 200 manages an IAB topology established by the subordinate IAB node 300. The IAB donor 200 can grasp a congestion state or the like in each IAB node 300.

As described above, the IAB-CU of the IAB donor 200 provides a routing configuration to an IAB-DU of each IAB node 300. The provided routing configuration includes the routing ID and the BAP address of the next hop. Each IAB node 300 performs routing based on the routing ID stored in a BAP header of a data packet. The routing ID is composed of a (destination) BAP address and a BAP path ID. Each IAB node 300 determines that the data packet reaches a destination when the (destination) BAP address matches a BAP address of the IAB node 300. On the other hand, each IAB node 300 transfers the received data packet to the IAB node 300 having the BAP address of the next hop in accordance with the routing configuration when the (destination) BAP address does not match the BAP address of the IAB node 300. Note that the routing configuration by the IAB donor 200 is performed through, for example, a BAP MAPPING CONFIGURATION message of the F1-AP.

In this manner, the routing configurations are centrally managed by the IAB donor 200. When the IAB node 300 is ready to transfer the data packet in accordance with such routing configuration, the IAB donor 200 takes the initiative to stop the local rerouting. This allows support the centralized management by the IAB donor 200. The fourth embodiment is an example in which the IAB donor 200 stops the local rerouting that is being executed in the IAB node 300 as described above.

In other words, in the fourth embodiment, first, the donor base station (for example, the IAB donor 200) transmits a first message indicating a stop instruction of the local rerouting, to a first relay node (for example, the IAB node 300). Second, the first relay node stops the local rerouting in response to receiving the first message.

Figure 18:
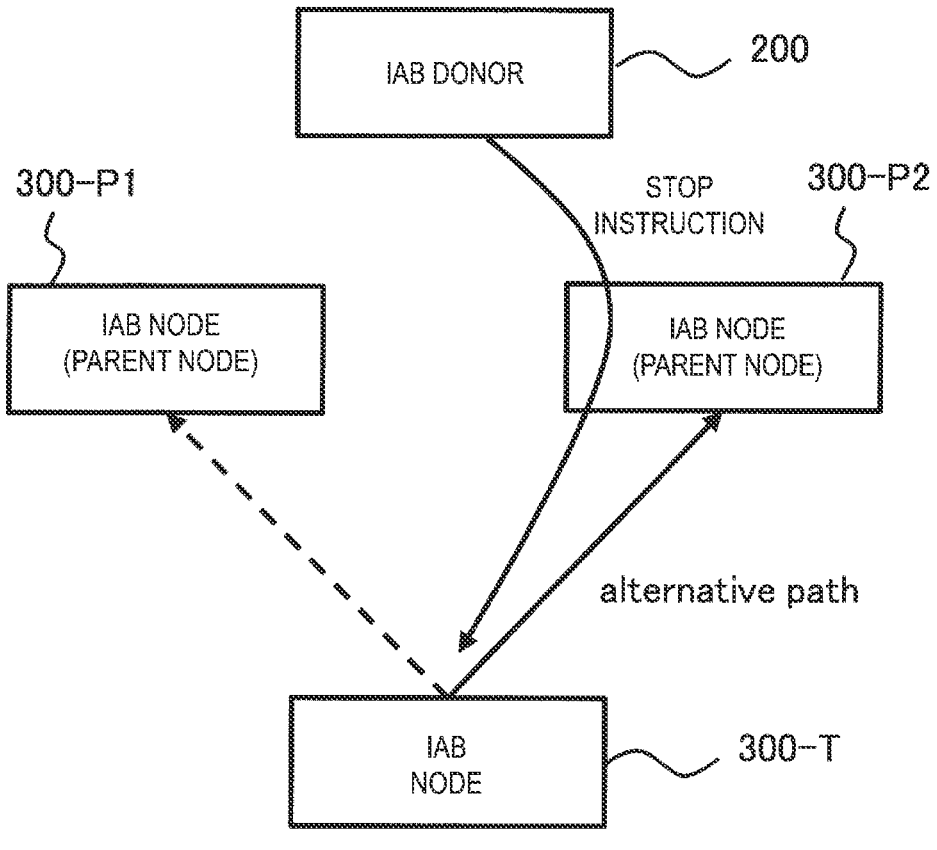
FIG. 18 is a diagram illustrating an example of a stop instruction in a fourth embodiment.

FIG. 18 illustrates an example in which the IAB node 300-T is executing local rerouting in the upstream direction to the IAB node 300-P2. In this case, the IAB-CU of the IAB donor 200 transmits a message indicating a stop instruction to the IAB-DU of the IAB node 300-T. The IAB node 300-T, upon receiving the message, stops the local rerouting to the IAB node 300-P2.

Figure 19:
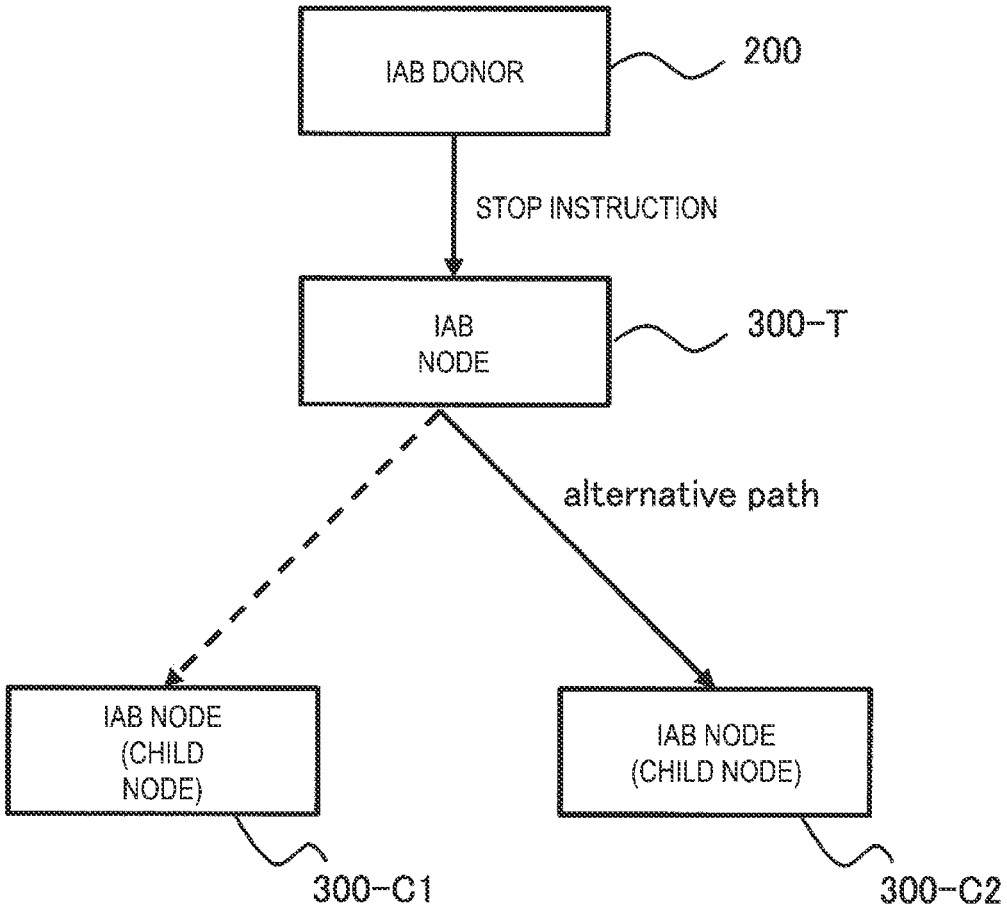
FIG. 19 is a diagram illustrating an example of the stop instruction in the fourth embodiment.

FIG. 19 illustrates an example in which the IAB node 300-T is executing local rerouting in the downstream direction to the IAB node 300-C2. Also in this case, the IAB node 300-T, upon receiving a message indicating a stop instruction from the IAB donor 200, stops the local rerouting to the IAB node 300-C2.

Figure 20:
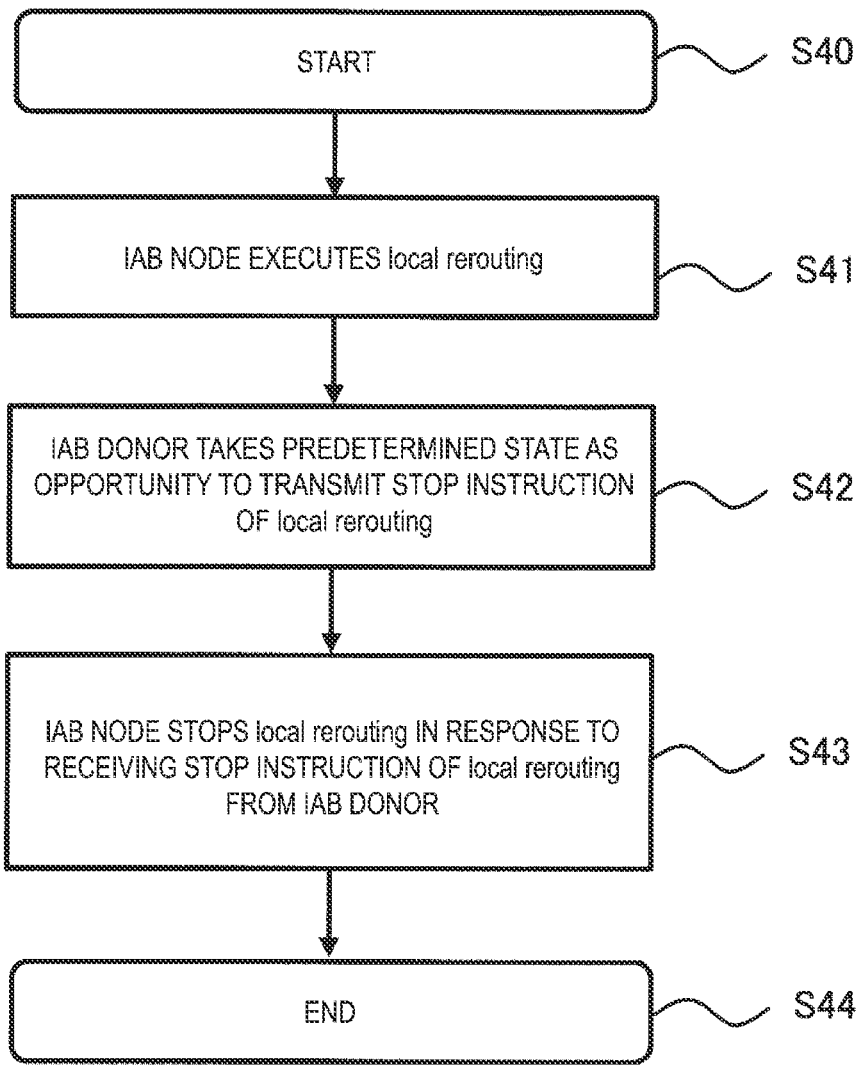
FIG. 20 is a diagram illustrating an operation example in the fourth embodiment.

FIG. 20 is a diagram illustrating an operation example in the fourth embodiment.

The IAB node 300 starts processing in step S40, and then, executes local rerouting in step S41.

In step S42, the IAB donor 200 takes reaching a predetermined state as an opportunity to transmit a message indicating a stop instruction of the local rerouting to the IAB node 300-T. The "predetermined state" is a state when the IAB donor 200 monitors a load (or congestion) state for each route and detects a path with a load lower than a certain value. For example, each IAB node 300 transmits a load status to the IAB donor 200 by using an F1-AP message or an RRC message. This allows the IAB donor 200 to monitor the load status for each route. The IAB donor 200 transmits a message indicating a stop instruction based on the load status. The message indicating the stop instruction is transmitted by an F1-AP message or an RRC message.

The message indicating the stop instruction may include, for example, the following information. In other words, a BH RLC Channel ID may be included in the message. In this case, the stop instruction is directed to a BH RLC Channel having the ID. Alternatively, a BH LCG ID may be included in the message. Also in this case, the stop instruction is directed to a BH LCG having the ID. Alternatively, a routing ID composed of a destination ID and a path ID may be included in the message. In this case, the stop instruction is directed to a route having the routing ID. Alternatively, an alternative path ID may be included in the message. In this case, the stop instruction is directed to an alternative path having the alternative path ID. The message indicating the stop instruction may include a valid period of the stop instruction in addition to the ID as described above. In this case, the valid period may be represented by a timer value or the like.

In step S43, the IAB node 300 stops the local rerouting in response to receiving the message indicating the stop instruction of the local rerouting. Stopping the local rerouting may include any of stopping the data transmission to the alternative path, (re-)selecting the path based on the routing configuration (in other words, the main path used before performing the local rerouting), and data transmission to the (re-)selected path.

In step S44, the IAB node 300 terminates a series of processing operations.

Note that, as another example in the fourth embodiment, the IAB donor 200 may transmit a message indicating a start instruction of the local rerouting that is being stopped to the IAB node 300. In this case, the message may include the routing ID and the ID of the alternative path directed by the start instruction. Based on this information, the IAB node 300 can grasp which alternative path of which routing ID is used to start the local rerouting.

As another example in the fourth embodiment, the IAB donor 200 may transmit a message indicating a change (or update) instruction of the local rerouting to the IAB node 300. The message may include the routing ID and the ID of the alternative path to be changed. Alternatively, the message may include information instructing local rerouting to a path indicating the next priority (for example, the second priority when the path having the first priority is currently selected) or information instructing local rerouting to a path different from the path currently selected by the IAB node 300.

Furthermore, as another example in the fourth embodiment, the IAB donor 200 may transmit to the IAB node 300 a message indicating an instruction to maintain or cancel maintaining the local rerouting that is being executed or stopped. When the IAB node 300 receives the message indicating the instruction to maintain the local rerouting that is being executed or stopped, the IAB node 300 maintains the determination to execute or stop the local rerouting as it is. On the other hand, when the IAB node 300 receives the message indicating the instruction to cancel maintaining the local rerouting that is being executed or stopped, the IAB node 300 cancels the determination to execute or stop the local rerouting. Further, a valid period of the maintaining may be configured. Specifically, the IAB node 300 starts a timer when receiving the message indicating the maintaining. While the timer is running, the IAB node 300 maintains the determination (state) to execute or stop the local rerouting. The IAB node 300 may not maintain the determination (state) to execute or stop the local rerouting when the timer expires. In other words, the IAB node 300 may determine to perform or stop the local rerouting. The timer value may be configured in advance by the IAB donor 200 or the parent node, or may be configured through the message indicating the maintaining.

The message described above as another example is transmitted as, for example, an F1-AP message or an RRC message.

Fifth Embodiment

The fourth embodiment describes the example in which the IAB donor 200 explicitly instructs the IAB node 300 to start local rerouting. The fifth embodiment is an example in which the IAB donor 200 notifies each IAB node 300 of a BH RLF in the downstream direction of each IAB node 300 as assist information for determining that local rerouting is performed by each IAB node 300.

Generally, the IAB-MT of the IAB node 300 detects a BH radio link failure (BH RLF) in the upstream direction of the IAB node. Therefore, the IAB node 300 basically has no means for detecting a BH RLF in the downstream direction.

In the fifth embodiment, the IAB node 300 can execute local rerouting by receiving a notification of occurrence of a BH RLF in the downstream direction of the node 300 itself from the IAB donor 200. Such a notification may assist in determining local rerouting in the downstream direction for the IAB node 300.

In other words, in the fifth embodiment, first, the donor base station (for example, the IAB donor 200) transmits a first message to the first relay node. The first message indicates that a radio link failure occurs in a backhaul link in the downstream direction from the first relay node to a second relay node subordinate to the first relay node. Second, the first relay node executes the local rerouting in response to receiving the first message.

Figure 21:
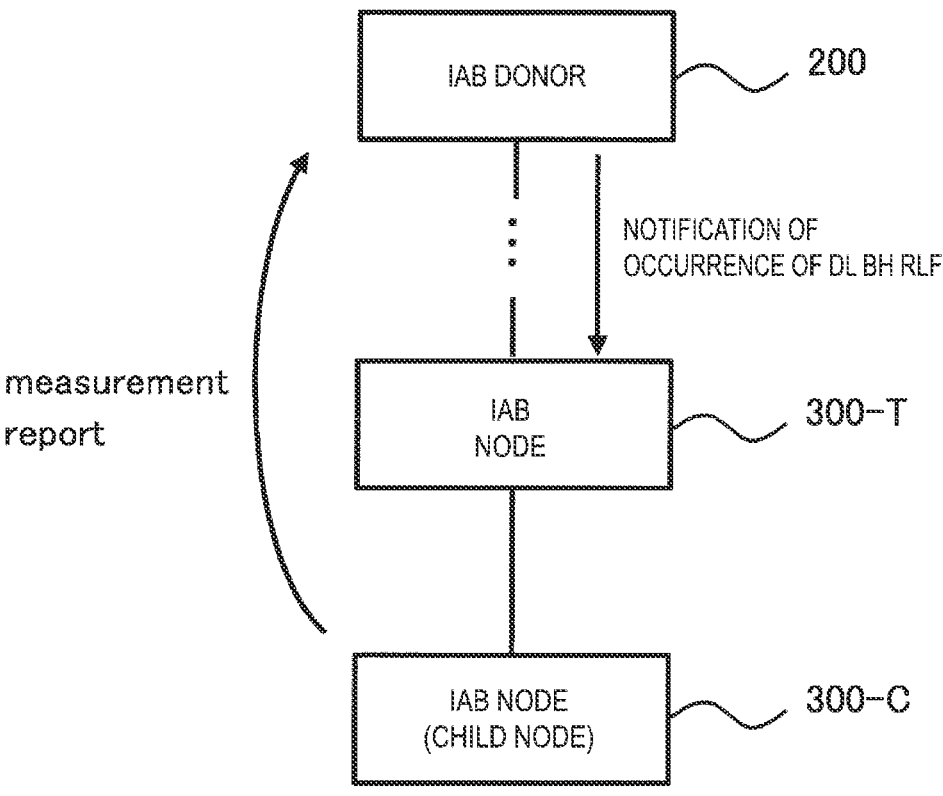
FIG. 21 is a diagram illustrating an example of local rerouting in a fifth embodiment.

FIG. 21 is a diagram illustrating an example of the local rerouting in the fifth embodiment. The IAB donor 200, upon detecting a BH RLF in the downstream direction of the IAB node 300-T, notifies the IAB node 300-T of an occurrence of a DL BH RLF. For example, when the IAB donor 200 receives a measurement report from the IAB node 300-C that is a child node of the IAB node 300-T, the IAB donor 200 may determine detection of the DL BH RLF in the IAB node 300-T. Then, the IAB donor 200 notifies the IAB node 300-T of the occurrence of the DL BH RLF in the IAB node 300-T. The IAB node 300-T, upon receiving the notification of the occurrence of the DL BH RLF, performs local rerouting to transfer the data packet to another child node on the alternative path.

Figure 22:
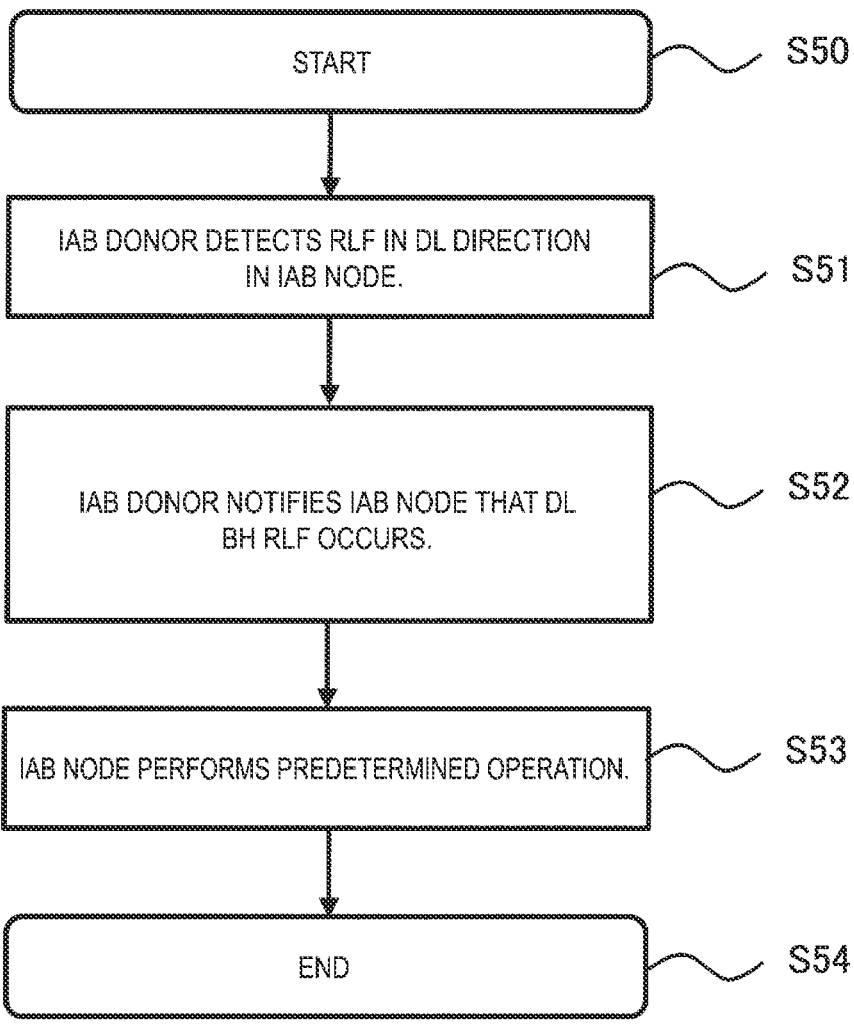
FIG. 22 is a diagram illustrating an operation example of the fifth embodiment.

FIG. 22 is a diagram illustrating an operation example of the fifth embodiment.

The IAB donor 200 starts processing in step S50, and then, detects an RLF in the DL direction in the IAB node 300-T in step S51. For example, the IAB-CU of the IAB donor 200 may receive a measurement report from the IAB-MT of the child node 300-C of the IAB node 300-T so that the IAB donor 200 may detect the DL BH RLF in the IAB node 300-T. Alternatively, for example, when Dual Connectivity (DC) is performed between the IAB node 300-T and another IAB node in the child node 300-C, the IAB donor 200 receives Master Cell Group (MCG) Failure Information and/or Secondary Cell Group (SCG) Failure Information from the child node 300-C. With this configuration, the IAB donor 200 may detect a DL BH RLF in the IAB node 300-T.

In step S52, the IAB donor 200 notifies the IAB node 300-T that the DL BH RLC occurs. For example, the IAB-CU of the IAB donor 200 may transmit the notification to the IAB-DU of the IAB node 300 by using an RRC message or an F1-AP message.

In step S53, the IAB node 300-T performs a predetermined operation in response to receiving the notification. An example of the predetermined operation includes local rerouting. In other words, the IAB node 300-T transfers the data packet to another child node on the alternative path, through local rerouting for the link (or the child node 300-C) in which the DL BH RLF occurs. An example of the predetermined operation includes stopping of DL transmission. In other words, the IAB node 300-T stops the transmission of the data packet to the child node 300-C.

In step S54, the IAB node 300 (and the IAB donor 200) terminates (terminate) a series of processing operations.

Note that as another example of the fifth embodiment, the IAB donor 200, when detecting that the DL BH RLF in the IAB node 300-T is recovered, may notify the IAB node 300-T that the DL BH RLF is recovered. For example, the IAB-CU of the IAB donor 200 may notify the IAB-DU of the IAB node 300-T that the DL BH RLF is recovered, using an RRC message or an F1-AP message.

Sixth Embodiment

A sixth embodiment is an example in which the IAB node 300 notifies the IAB donor 200 of start or stop of executing local rerouting when the IAB node 300 determines the start or stop. In other words, first, the first relay node (for example, the IAB node 300) transmits a second message indicating that the first relay node determines start or stop of executing local rerouting to the donor base station (for example, the IAB donor 200).

This allows, for example, the IAB donor 200 to grasp whether local rerouting is performed in the IAB node 300. Then, the IAB donor 200 can instruct the IAB node 300 to stop or start the local rerouting that is being executed as described in the fourth embodiment.

Figure 23:
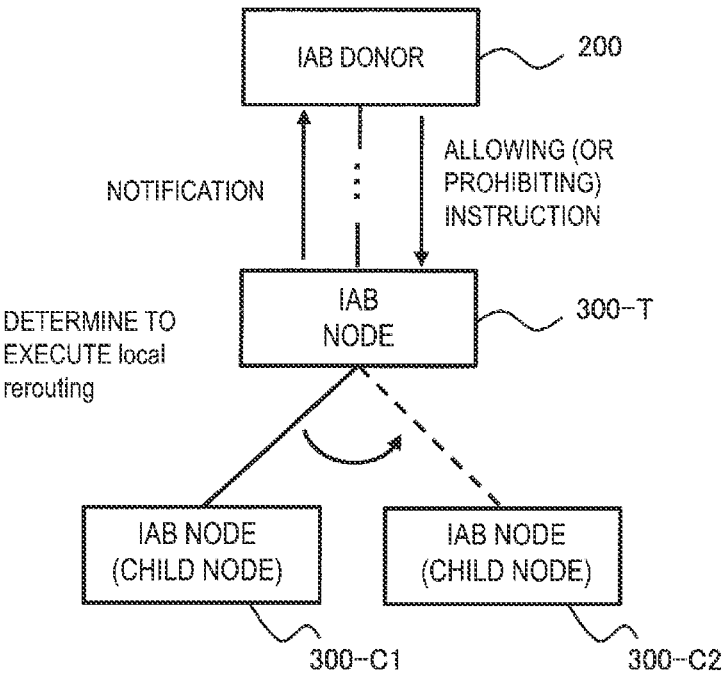
FIG. 23 is a diagram illustrating an example of a notification by an IAB node of a sixth embodiment.

FIG. 23 is a diagram illustrating an example of the notification by the IAB node 300-T. FIG. 23 illustrates an example when determining to execute the local rerouting in the downstream direction of the IAB node 300-T.

As illustrated in FIG. 23, the IAB node 300-T, when determining start or stop of executing local rerouting from the child node 300-C1 to the child node 300-C2, transmits a message indicating the determination to the IAB donor 200.

In this case, the IAB donor 200 may transmit, to the IAB node 300-T, in response to receiving the message, as necessary, a message instructing to allow or prohibit start or stop of executing local rerouting in the IAB node 300-T.

The IAB node 300-T starts or stops executing the local rerouting in response to receiving the message of the allowing or prohibiting instruction. Specifically, for example, the following is performed.

Specifically, when the IAB node 300-T receives from the IAB donor 200 the message indicating allowing start of executing the local rerouting with respect to the determining start of executing the local rerouting, the IAB node 300-T starts executing the local rerouting in response to receiving the message. When the IAB node 300-T receives from the IAB donor 200 the message indicating prohibiting start of executing the local rerouting with respect to the determining start of executing the local rerouting, the IAB node 300-T does not execute local rerouting in response to receiving the message. Further, when the IAB node 300-T receives from the IAB donor 200 the message indicating allowing stop of executing the local rerouting with respect to the determining stop of executing the local rerouting, the IAB node 300-T stops the local rerouting that is being executed in response to receiving the message. Furthermore, when the IAB node 300-T receives from the IAB donor 200 the message indicating prohibiting stop of executing the local rerouting with respect to the determining stop of executing the local rerouting, the IAB node 300-T continues to execute the local rerouting that is being executed in response to receiving the message.

Note that the example illustrated in FIG. 23 is the example of start of executing local rerouting in the downstream direction of the IAB node 300-T, but may apply to an example of start of executing local rerouting in the upstream direction of the IAB node 300-T.

Figure 24:
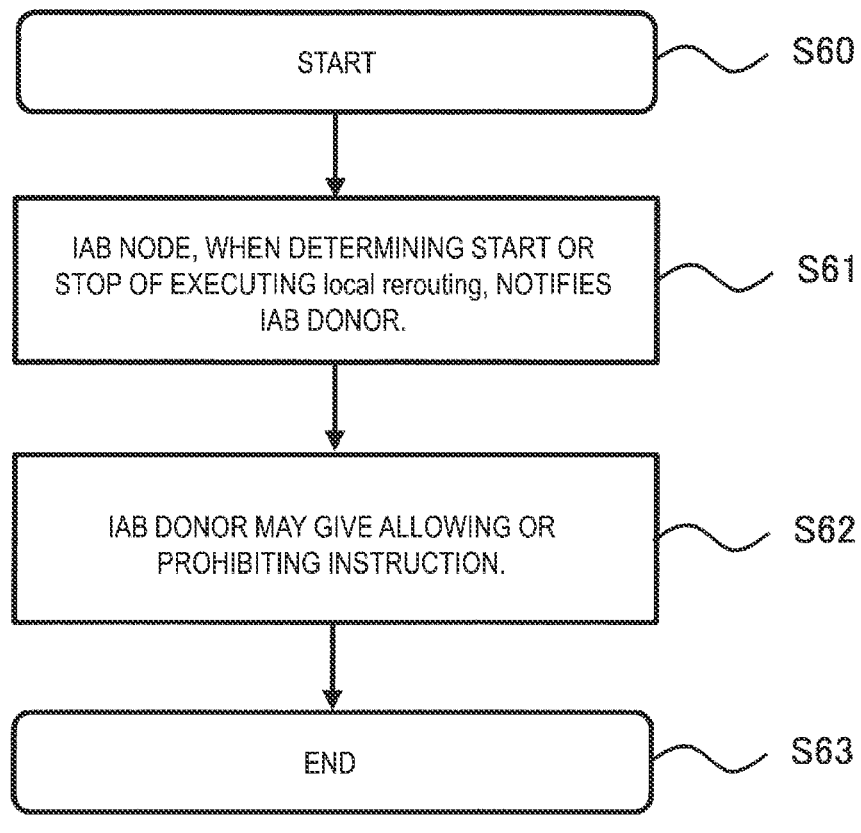
FIG. 24 is a diagram illustrating an operation example of the sixth embodiment.

FIG. 24 is a diagram illustrating an operation example of the sixth embodiment.

The IAB node 300-T starts processing in step S60, and then, transmits a message to the IAB donor 200 when determining start or stop of executing local rerouting in step S61.

The message may first include information indicating which route is subject to local rerouting. Specifically, the information may be the BH RLC Channel ID. Alternatively, the information may be the BH LCG ID. Alternatively, the information may be the routing ID composed of the destination ID and the path ID.

Second, the message may include information indicating to which route the local rerouting has been performed. Specifically, the information may be the alternative path ID. In this case, the alternative path ID may be represented by the routing ID or the path ID.

Furthermore, third, the message may include information (cause information) indicating why executing the local rerouting is started or stopped. To be more specific, the information may be due to receiving a Type 1 Indication, a Type 2 Indication, a Type 1/2 Indication, a Type 3 Indication, or a Type 4 Indication of a BH RLF. Alternatively, the information may be due to receiving a flow control feedback message or a flow control leaving feedback message. Alternatively, the information may be a certain period elapsing after receiving a flow control feedback message or a flow control leaving feedback message. Alternatively, the information may be due to being incapable of transferring a data packet (or due to failing to transfer a data packet for a certain period in the second embodiment). Alternatively, the information may be due to an instruction from the parent node.

The message may be transmitted as an RRC message or an F1-AP message.

In step S62, the IAB donor 200 may transmit a message indicating allowing or prohibiting to the IAB node 300-T. In this case, when the IAB donor 200 transmits the message indicating allowing start of executing local rerouting, the IAB donor 200 may indicate a routing ID or a path ID of a local rerouting destination in the message. This message may also be transmitted as an RRC message or an F1-AP message.

The IAB node 300-T may start executing or not execute local rerouting in response to receiving the message indicating allowing or prohibiting, as described above.

Note that in step S61, when the IAB node 300 determines to execute local rerouting, the IAB node 300 may ask the IAB donor 200 to execute local rerouting by transmitting a message to the IAB donor 200. In step S62, the IAB donor 200 gives an allowing or prohibiting instruction to the IAB node 300 in response to the asking.

Seventh Embodiment

A seventh embodiment is an example in which the IAB node 300 determines to execute or stop local rerouting by combining a plurality of execution conditions.

Specifically, first, the relay node (for example, the IAB node 300) executes local rerouting to transfer a data packet to an alternative path, the alternative path being different from a path to another relay node, in response to at least one of execution conditions being satisfied, the execution conditions including receiving a flow control feedback message, receiving a failure occurrence notification in a backhaul link between the relay node and the other relay node, and failing to transfer the data packet for a certain period. Second, the relay node stops the local rerouting in response to a stopping condition being satisfied after executing the local rerouting.

By combining a plurality of execution conditions to determine to execute or stop local rerouting, the flexibility of implementation and deployment for each network can be increased.

Figure 25:
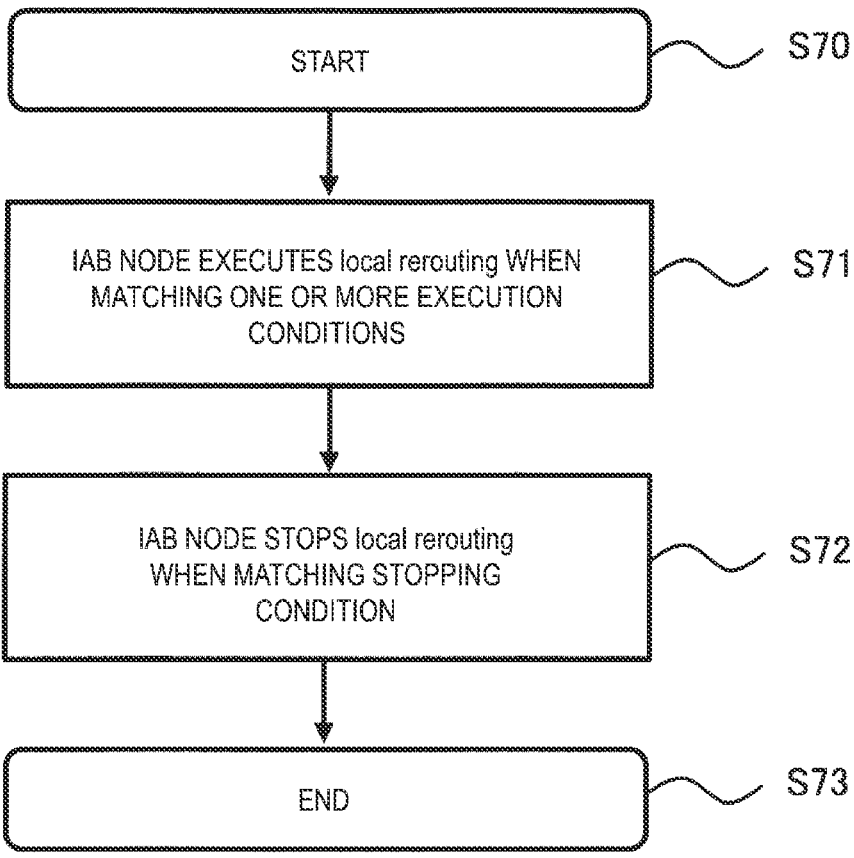
FIG. 25 is a diagram illustrating an operation example of a seventh embodiment.

FIG. 25 is a diagram illustrating an operation example of the seventh embodiment.

The IAB node 300 starts processing in step S70, and then, executes local rerouting when matching one or more execution conditions in step S71.

The execution conditions include following three conditions, for example.

(C1) Receiving a flow control feedback message, or a certain period elapsing after receiving a flow control feedback message (first embodiment).

(C2) Receiving a Type 1 Indication, a Type 2 Indication, or a Type 1/2 Indication of a BH RLF.

(C3) Failing to transfer a data packet for a certain period (second embodiment).

The IAB node 300 executes local rerouting when a situation matches at least one execution condition among the three execution conditions.

In step S72, the IAB node 300 stops the local rerouting when matching the stopping condition.

An example of the stopping condition includes receiving a Type 3 Indication of a BH RLF. The IAB node 300 stops the local rerouting in response to receiving the Type 3 Indication even if starting the local rerouting in step S71.

In step S73, the IAB node 300 terminates a series of processing operations.

Figure 26:
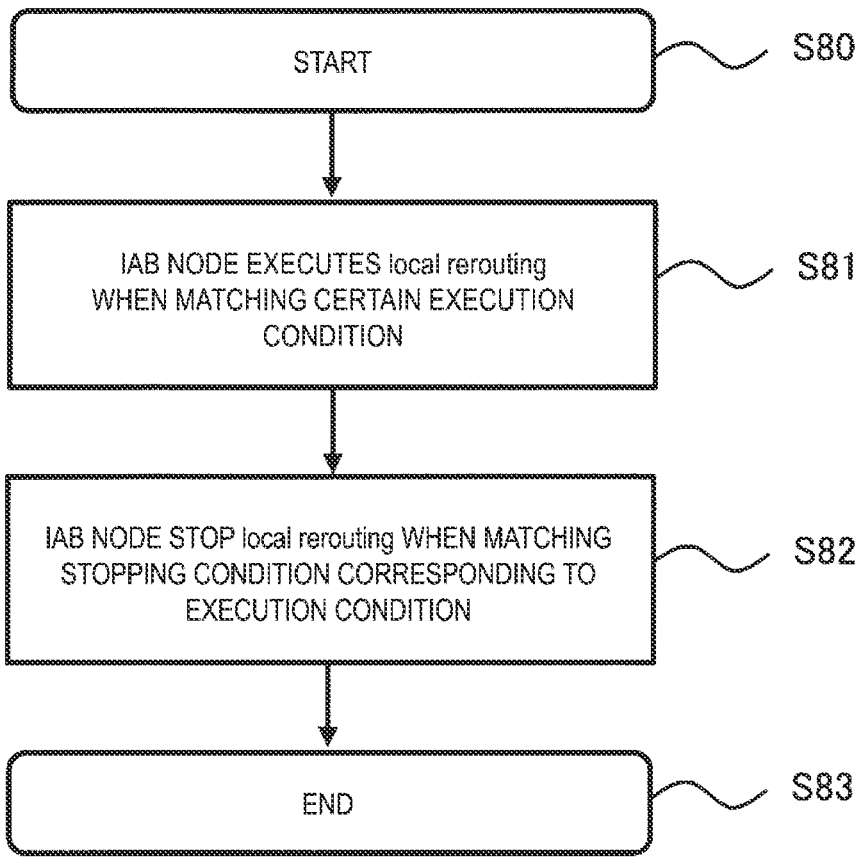
FIG. 26 is a diagram illustrating another operation example of the seventh embodiment.

FIG. 26 is a diagram illustrating another operation example of the seventh embodiment.

The IAB node 300 starts processing in step S80, and then, executes local rerouting when matching an execution condition in step S81. The execution condition is at least one of the three execution conditions (C1) to (C3) described above.

In step S82, the IAB node 300 stops the local rerouting when matching the stopping condition corresponding to the execution condition. The stopping condition corresponding to the execution condition is, for example, "receiving a flow control leaving feedback message" with respect to the execution condition "receiving a flow control feedback message". For example, assume that the IAB node 300 starts local rerouting based on the execution condition "receiving a flow control feedback message" in step S81. In such a case, the IAB node 300 stops local rerouting if matching the stopping condition "receiving a flow control leaving feedback message". In this case, it can be said that the stopping condition corresponding to the execution condition is a condition having a content opposite to the execution condition. On the other hand, assume that the IAB node 300 starts local rerouting based on the execution condition "receiving a flow control feedback message". In such a case, the IAB node 300 continues to execute the local rerouting without stopping because of not matching the stopping condition corresponding to the execution condition even if receiving the Type 3 Indication. This is because "receiving a Type 3 Indication" is a stopping condition that does not correspond to the execution condition "receiving a flow control feedback message".

In step S83, the IAB node 300 terminates a series of processing operations.

Eighth Embodiment

The seventh embodiment describes a plurality of execution conditions related to local rerouting. An eighth embodiment is an example in which the IAB donor 200 configures for the IAB node 300 an execution condition to be used by the IAB node 300 from among a plurality of execution conditions. Specifically, the donor base station (for example, the IAB donor 200) subordinating the relay node (for example, the IAB node 300) configures a plurality of execution conditions for the relay node.

Figure 27:
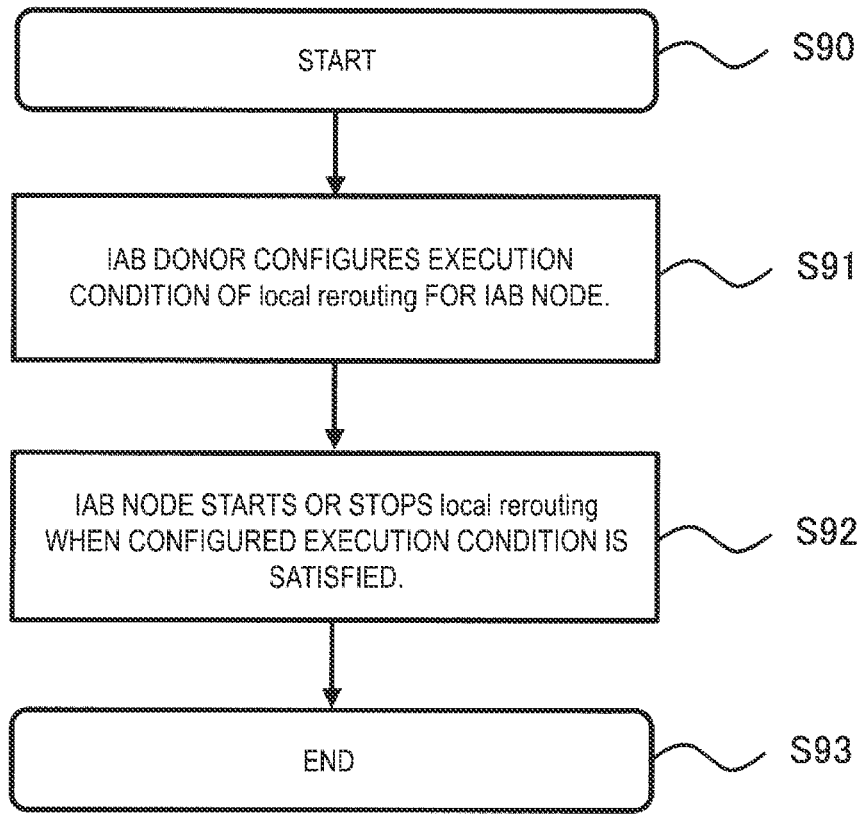
FIG. 27 is a diagram illustrating an operation example of an eighth embodiment.

FIG. 27 is a diagram illustrating an operation example of the eighth embodiment.

The IAB donor 200 starts processing in step S90, and then, configures for the IAB node 300 the execution condition to be used by the IAB node 300 from among a plurality of execution conditions for the local rerouting in step S91. The execution conditions to be configured includes followings.

(D1) Receiving a Type 4 Indication of a BH RLF.
(D2) Receiving a Type 1/2 Indication of a BH RLF.
(D3) Receiving a downlink flow control feedback message or an uplink flow control feedback message.
(D4) Failing to transfer a data packet for a certain period (second embodiment).
(D5) One or more of a threshold, a timer value, and an upper limit value of the number of times pertaining to the above (D1) to (D4). The IAB donor 200 may configure the stopping condition described in the seventh embodiment for the IAB node 300.

The configuration is performed, for example, by the IAB donor 200 transmitting an RRC message or an F1-AP message including one or more execution conditions (and stopping conditions) to the IAB node 300.

In step S92, the IAB node 300 starts (or stops) the local rerouting when a situation matches the configured execution condition (or the stopping condition). When a plurality of execution conditions (or stopping conditions) are configured, the IAB node 300 starts (or stops) the local rerouting in a situation matching one or more of the execution conditions.

In step S93, the IAB node 300 terminates a series of processing operations.

Ninth Embodiment

A ninth embodiment is an example in which the IAB donor 200 configures an alternative path in local rerouting.

There is a discussion that local rerouting should be performed under centralized control by the IAB donor 200 rather than distributed control by the IAB node 300. This is because the IAB donor 200 grasps the entire IAB topology, and the routing configurations are optimized by the IAB donor 200. Thus, there is a discussion that the IAB donor 200 should be able to configure also an alternative path in local rerouting. Specifically, the discussion is that the IAB donor 200 assigns another path to the IAB node 300 for the same routing ID (destination address+path ID).

The ninth embodiment is an example of configuring an alternative path by the IAB donor 200, specifically, an example in which the IAB donor 200 configures an alternative path by associating the routing ID configured through the routing configuration with the routing ID of the alternative path.

In other words, first, the donor base station (for example, the IAB donor 200) makes a configuration of an alternative path for the first relay node (for example, the IAB node 300), the configuration of the alternative path including information related to the alternative path associated with information related to a main path. Second, the first relay node selects the alternative path, based on the configuration of the alternative path.

Figure 28:
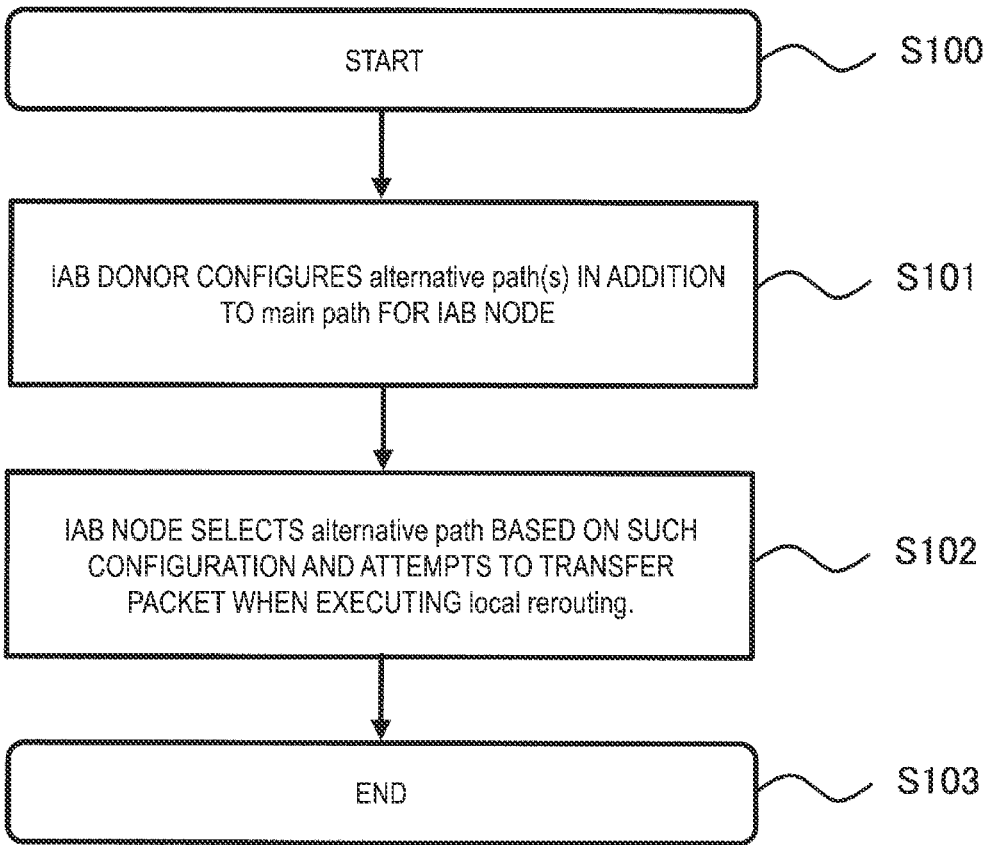
FIG. 28 is a diagram illustrating an operation example of a ninth embodiment.

FIG. 28 is a diagram illustrating an operation example of the ninth embodiment.

The IAB donor 200 starts processing in step S100, and then, configures the alternative path(s) in addition to the main path for the IAB node 300 in step S101.

The main path is, for example, a path configured for the IAB node 300 through the routing configuration by the IAB donor 200 described in the fourth embodiment. For the IAB donor 200, the main path for each IAB node 300 is configured in advance through the routing configuration. The alternative path is, for example, a path selected when local rerouting is performed in the IAB node 300. In the examples of FIGS. 18 and 19, the main path is a path from the IAB node 300-T to the IAB node 300-P1 or 300-C1, and the alternative path is a path from the IAB node 300-T to the IAB node 300-P2 or 300-C2.

Referring back to FIG. 28, in step S101, the IAB donor 200 includes information related to the alternative path in a BAP MAPPING CONFIGURATION message or an RRC Reconfiguration (RRC configuration) message of the F1-AP, and transmits the message to the IAB node 300. With this configuration, the IAB donor 200 makes the alternative path configuration for the IAB node 300.

The information related to the alternative path may include a plurality of pieces of information corresponding to a plurality of alternative paths.

The information related to the alternative path, first, includes association information of the routing ID of the main path and the routing ID of the alternative path. For example, the information related to the alternative path may include the routing ID of the alternative path, and the routing ID of the main path may be designated in association with the routing ID of the alternative path so that the association (or correspondence) may be made. Alternatively, for example, a grouping ID may be used as the association information. The grouping ID is an ID defined for grouping the path ID of the main path and the path ID of the alternative path. The routing ID of the main path and the routing ID of the alternative path are associated with each other by the grouping ID.

Second, the information related to the alternative path includes the destination ID of the alternative path. The destination ID of the alternative path is the same as the destination ID of the main path. However, when inter-donor-DU rerouting is performed (twelfth embodiment), these two destination IDs may be different from each other.

Third, the information related to the alternative path includes the path ID of the alternative path. The path ID of the alternative path may be different from or the same as the path ID of the main path. When the path ID of the alternative path is the same as the path ID of the main path, a list of Next Hop BAP Addresses may be configured for each routing ID. In this case, the first entry of the list may be identified as the next hop BAP address of the main path, and the second and subsequent entries may be identified as the next hop BAP addresses of the alternative paths. Alternatively, the order of entries in the list may represent the priority of the next hop BAP address.

Fourth, the information related to the alternative path includes the routing ID of the alternative path.

The information related to the alternative path may further include the following information. Specifically, in correspondence with (or in association with) the alternative path, (E1) A Next Hop BAP Address,
(E2) An IAB donor DU BAP address (IAB-donor-DU BAP address),
(E3) A cell ID,
(E4) An Egress BH RLC CH ID, and
(E5) An Ingress BH RLC CH ID may be included in whole or in part.

The information related to the alternative path may further include the following information. Specifically, in correspondence with (or in association with) the alternative path, (F1) A priority configuration,
(F2) A selection probability configuration, and
(F3) A timer value indicating a valid period and a timer value indicating a prohibited period may be included in whole or in part.

The above (F1) priority configuration is configuration information for selecting alternative paths in descending order of priority. For example, when the configuration information includes the priorities "1", "2", ... of a plurality of alternative paths, the IAB node 300 selects the alternative path having the priority "1" and attempts to transfer a packet when performing local rerouting. As a result, when failing to transfer the packet, the IAB node 300 selects the alternative path having the priority "2". Alternatively, when the configuration information includes the following information, priority configuration may not be included.

(G1) An Intra-donor-DU alternative path (the main path and the alternative path exist in the same donor DU)
(G2) An Intra-donor alternative path (the main path and the alternative path exist in the same donor)

(G3) An Inter-donor alternative path (the main path and the alternative path exist in the different donors)

In this case, the IAB node 300 may select an alternative path in the order of an intra-donor-DU alternative path, an intra-donor alternative path, and an inter-donor alternative path.

The above (F2) selection probability configuration refers to a selection probability expressed in percent or an antilog (0 to 1) for each alternative path. For example, the IAB node 300 uses a random number to select an alternative path based on a random number value and the selection probability. For example, assume that three alternative paths are present, and each selection probability is {0.5, 0.3, 0.2}. In this case, the IAB node 300 selects an alternative path having the first selection probability when the random number value is 0.4, selects an alternative path having the second selection probability when the random number value is 0.7, and selects an alternative path having the third selection probability when the random number value is 0.9. Note that the total value of the selection probabilities is preferably 100% (or 1).

The above (F3) refers to a timer value indicating a valid period configured for each alternative path and a timer value indicating a prohibited period. For example, the timer value is used as follows.

Specifically, the IAB node 300 starts counting by the timer upon selecting the alternative path by the local rerouting or upon starting to transfer the packet to the alternative path. Then, the IAB node 300 can use the selected alternative path when the count value of the timer does not reach the timer value indicating the valid period (while the timer is running). On the other hand, the IAB node 300 stops (or prohibits) the use of the alternative path when the count value of the timer reaches the timer value indicating the valid period (when the timer expires). Then, the IAB node 300 starts counting by the timer after terminating (or stopping or prohibiting) the executed local rerouting. The IAB node 300 prohibits the use of the terminated alternative path when the count value does not reach the timer value indicating the prohibited period (while the timer is running). The alternative path is removed from candidates for selecting an alternative path and another alternative path is selected while the local rerouting continues. On the other hand, when the count value reaches the timer value indicating the prohibited period (when the timer expires), the terminated alternative path can be used in the IAB node 300. The alternative path may be a candidate for selecting an alternative path.

In step S102, the IAB node 300 selects an alternative path, based on the alternative path configuration configured by the IAB donor 200 and attempts to transfer the packet when performing local rerouting.

In step S103, the IAB node 300 terminates a series of processing operations.

Tenth Embodiment

When local rerouting is performed in the IAB node 300, the IAB donor 200 may change the routing configurations for reasons such as degraded performance of the entire topology in some cases. A tenth embodiment is an example in which the operation of local rerouting is stopped (or canceled) when the routing configuration is changed.

Specifically, first, the first relay node (for example, the IAB node 300) starts local rerouting. Second, the donor base station (for example, the IAB donor 200) transmits the first message to the first relay node, the first message indicating updating the routing configuration configured for the first relay node. Third, the first relay node stops the local rerouting in response to receiving the first message.

Figure 29:
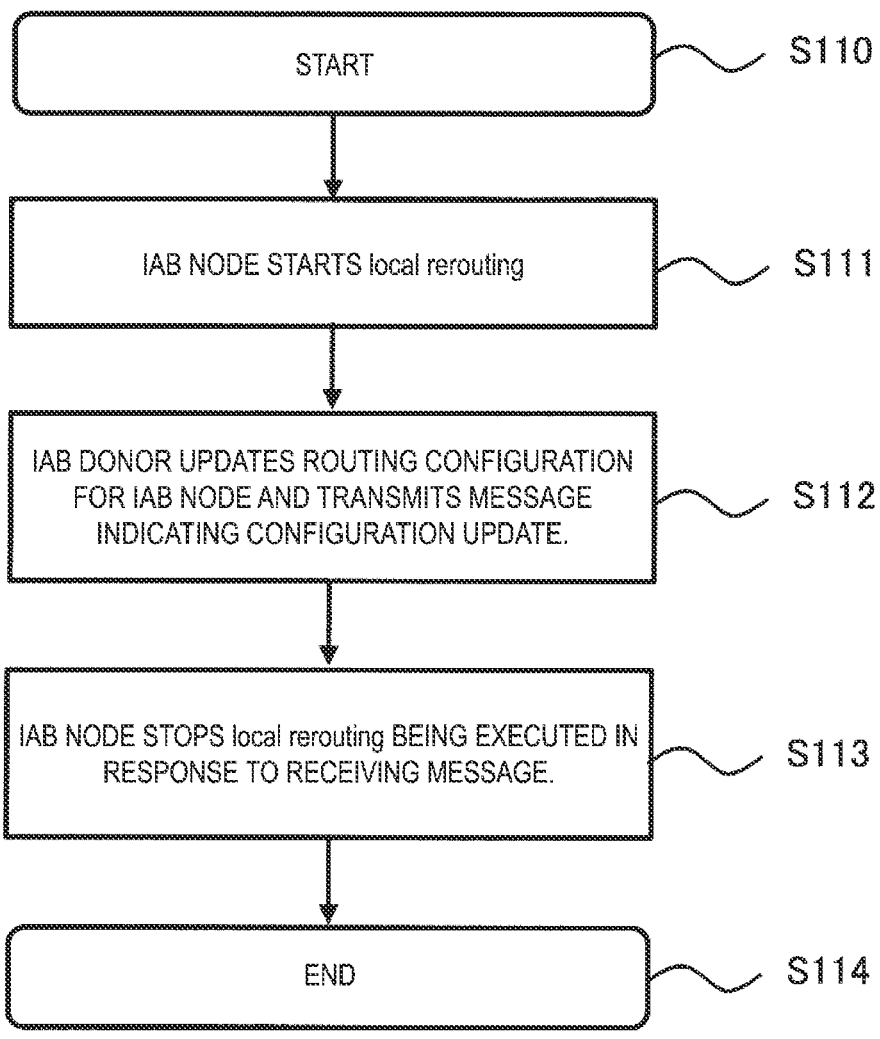
FIG. 29 is a diagram illustrating an operation example in a tenth embodiment.

FIG. 29 is a diagram illustrating an operation example in the tenth embodiment.

The IAB node 300 starts processing in step S110, and then, starts local rerouting in step S111.

At step S112, the IAB donor 200 updates the routing configurations for the IAB nodes for reasons such as detecting degraded performance of the entire topology. For example, the IAB donor 200 may detect the degraded performance of the entire topology by receiving a message from the IAB node 300 indicating a load status such as an increased load on the IAB node 300. Then, the IAB donor 200 transmits a message indicating configuration update to all the subordinate IAB nodes 300. The message may be an F1-AP message or an RRC message.

In step S113, the IAB node 300 stops the local rerouting in response to receiving the message indicating the configuration update. For example, assume that the local rerouting is started in response to reception of a Type 2 Indication of a BF RLF. In such a case, "stopping" means that the IAB node 300 "stops" without waiting for a Type 3 Indication and does not need to expect reception of the Type 3 Indication.

In step S114, the IAB node 300 terminates a series of processing operations.

Eleventh Embodiment

Even if the IAB node 300 selects an alternative path by local rerouting, the selected alternative path may be more congested than the path before selection in some cases. This may cause the delay of the data packet transfer to increase and degrade the performance of the entire topology in some cases.

An eleventh embodiment is an example in which the IAB donor 200 transmits load information of each path to the IAB node 300. Specifically, first, the donor base station (for example, the IAB donor 200) transmits the first message to the first relay node (for example, the IAB node 300), the first message including load information of a path between the first relay node and the second relay node. Second, the first relay node executes or stops local rerouting based on the load information.

The IAB donor 200 transmits the load information of each path to the IAB node 300, so that the IAB node 300 can select an alternative path having a good load status when local rerouting is performed. This can suppress the data packet transfer delay and suppress the degraded performance of the entire topology.

Figure 30:
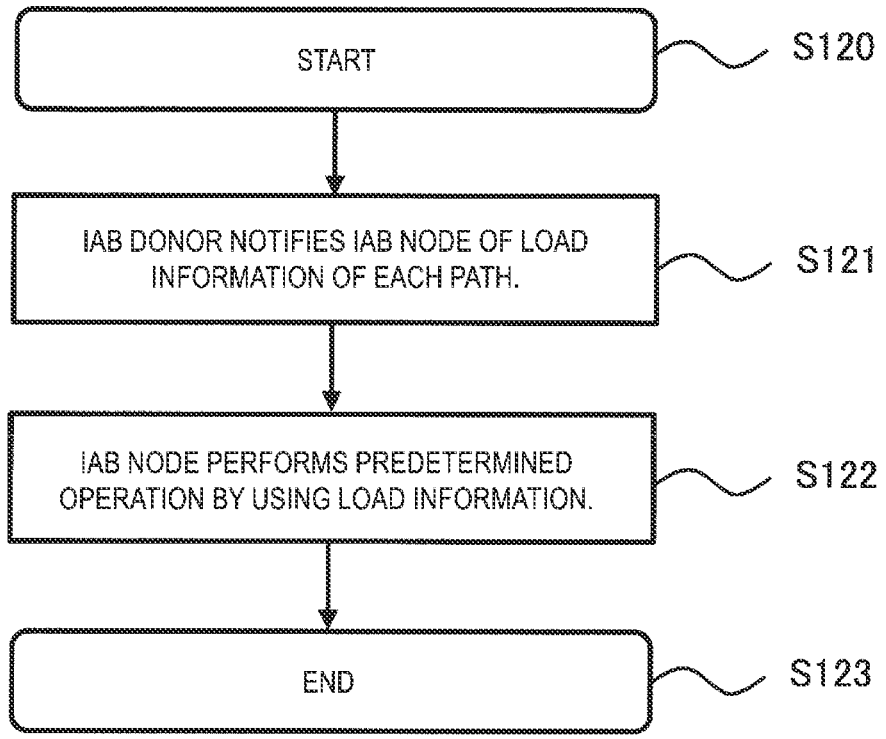
FIG. 30 is a diagram illustrating an operation example in an eleventh embodiment.

FIG. 30 is a diagram illustrating an operation example in the eleventh embodiment.

The IAB donor 200 starts processing in step S120, and then, transmits a message including the load information of each path to the IAB node 300 in step S121.

Examples of an opportunity for the IAB donor 200 to transmit the message include the following. Specifically, the IAB donor 200 may periodically transmit the message. Alternatively, the IAB donor 200 may transmit the message upon receiving a request from the IAB node 300. The "request" in this case refers to, for example, a request transmitted from the IAB node 300 in response to a determination made by the IAB node 300 regarding local rerouting. Alternatively, the IAB donor 200 transmits the message when the IAB donor 200 determines necessity. For example, "when determining necessity" refers to when a load of a path is significantly increased. Since the IAB donor 200 can acquire the load information from the IAB node 300 on the path, when a load of a path is increased to a threshold value or more in a short time, the IAB donor 200 may determine that the load is significantly increased based on the load information.

The "load information of each path" included in the message including the "load information of each path" transmitted by the IAB donor 200 refers to, for example, a load level for each routing ID or a load level for each path ID. In this case, the load level is expressed as a percentage of 0 to 100%, for example.

Note that instead of the "load information", priority information for a path may be notified. The IAB donor 200 can increase the priority of a path with a low load. This allows a path with a low load to be more likely to be selected as an alternative path in the IAB node 300. Note that the priority information configured in the IAB node 300 can be updated, for example, by transmitting a message including the priority information. Therefore, for example, the IAB donor 200, when detecting that a load of a path is increased, can configure the priority of the path configured for the IAB node 300 to be also low by updating the priority information. With this configuration, the priority information for each path configured by the routing configuration by the IAB donor 200 can be updated by transmitting the message in step S121. Updating the priority information using the message in step S121 can be performed more frequently than configuring by the routing configuration.

In step S122, the IAB node 300 performs a predetermined operation using the load information.

The predetermined operation, first, includes determining to execute or stop local rerouting. For example, when the currently used path is the main path and the load on the main path indicated by the load information exceeds a certain value, the IAB node 300 determines to execute local rerouting. For example, when the currently used path is the alternative path and the load on the alternative path indicated by the load information exceeds a certain value, the IAB node 300 determines to stop local rerouting. When the priority information is used instead of the load information, the IAB node 300 determines to execute local rerouting if the priority information of the currently used main path is lower than a priority threshold. On the other hand, the IAB node 300 stops local rerouting if the priority information of the currently used alternative path is lower than the priority threshold. The certain value or the priority threshold may be configured by the IAB donor 200.

Second, the predetermined operation includes selecting an alternative path. For example, the IAB node 300, when executing local rerouting, uses the load information to select an alternative path based on the following criteria. Specifically, the IAB node 300 selects a path with the lowest load among the loads indicated in the load information as an alternative path. Alternatively, the IAB node 300 may arbitrarily select from the paths with a certain load or lower. When the priority information is used instead of the load information, the IAB node 300 selects a path having the highest priority among the priorities indicated in the priority information as an alternative path. Alternatively, the IAB node 300 may select, as an alternative path, an arbitrary path from among the paths having a certain priority or higher.

Twelfth Embodiment

A twelfth embodiment is an example in which the IAB donor 200 configures the IAB-donor-DU BAP Address for the IAB node 300. The IAB node 300 can select an IAB-donor-DU BAP address in another IAB donor different from IAB donor 200 as an alternative path. This allows Inter-donor-DU rerouting.

Specifically, first, the donor base station (for example, the IAB donor 200) configures the BAP address of the donor base station for the first relay node (for example, the IAB node 300). Second, the donor base station configures a BAP address of another donor base station different from the donor base station for the first relay node. Third, the first relay node determines to execute local rerouting. Fourth, the first relay node selects a path to any BAP address of the BAP address of the donor base station and the BAP address of the other donor base station as an alternative path.

Note that the IAB-donor-DU BAP address is, for example, the BAP address of the IAB-DU in the IAB donor.

Figure 31:
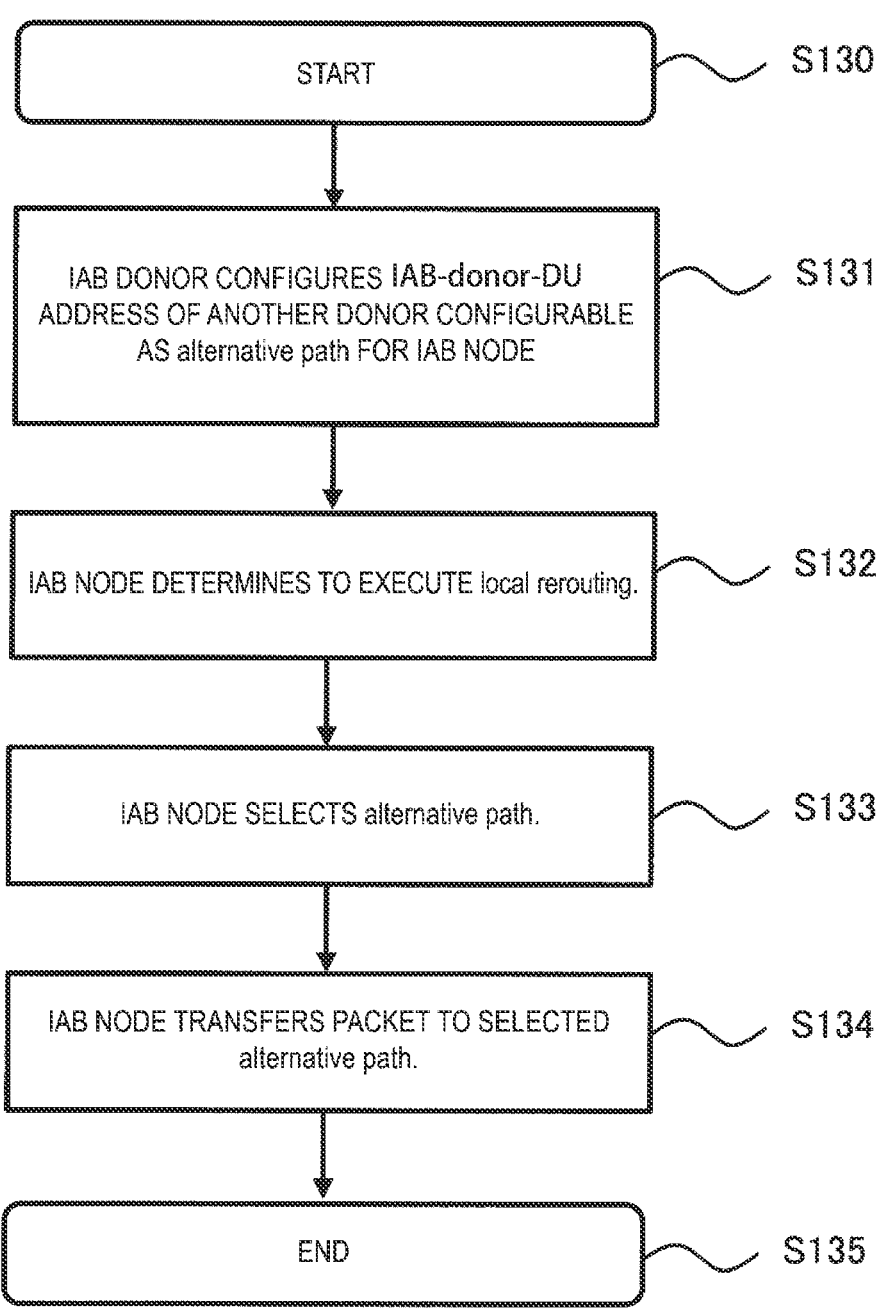
FIG. 31 is a diagram illustrating an operation example of a twelfth embodiment.

FIG. 31 is a diagram illustrating an operation example of the twelfth embodiment.

The IAB donor 200 starts processing in step S130, and then, configures the IAB-donor-DU BAP address of another IAB donor selectable as an alternative path for the IAB node 300 in step S131. The other IAB donor refers to an IAB donor different from the IAB donor 200. Here, the BAP address of the IAB-DU belonging to another donor different from the IAB donor 200 is configured. Note that the IAB donor 200 configures the BAP address of the IAB-DU of another IAB donor using, for example, an F1-AP message. The BAP address of the IAB-DU of the IAB donor 200 itself is configured, before this processing is performed, by the IAB donor 200 by the routing configuration as described in the fourth embodiment. Note that for the IAB donor 200, a forwarding path with the other IAB donor may be established in advance.

In step S132, the IAB node 300 determines to execute local rerouting. For example, the IAB node 300 may determine to execute local rerouting when detecting a BH RLF. Alternatively, local rerouting may be determined to be executed according to the opportunities described in the above-described (first embodiment), (second embodiment), (fourth embodiment), (seventh embodiment), or (eighth embodiment).

In step S134, the IAB node 300 selects the alternative path. The IAB node 300 selects a path (routing ID) of the BAP address of the IAB-DU of the IAB donor 200 (own donor) matching the destination BAP address or the BAP address of the IAB-DU of another IAB donor selectable as an alternative path, from the routing configurations (routing ID=destination BAP address+path ID).

In step S134, the IAB node 300 transfers the packet to the selected alternative path.

In step S135, the IAB node 300 terminates a series of processing operations.

Other Embodiments

A program causing a computer to execute each type of processing performed by the UE 100, the gNB 200, or the IAB node 300 may be provided. The program may be recorded in a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM or a DVD-ROM.

Circuits for executing each type of processing to be performed by the UE 100, the gNB 200, or the IAB node 300 may be integrated, and at least part of the UE 100, the gNB 200, or the IAB node 300 may be configured as a semiconductor integrated circuit (a chipset or an SoC).

Although embodiments have been described in detail with reference to the drawings, a specific configuration is not limited to those described above, and various design modifications and the like can be made without departing from the scope of the present disclosure. All of or a part of the examples can be combined together as long as the combination remains consistent.

Supplementary Note

Introduction

A revised work item related to NR Enhancements to Integrated Access AND Backhaul (NR eIAB) was approved. Some of the purposes thereof are as follows.

Enhancements of Topology Adaptation

Specification of procedures for inter-donor IAB-node migration to enhance robustness and load balancing, including enhancements to reduce signaling load.

Specification of enhancements to reduce service interruption due to IAB-node migration and BH RLF recovery.

Specification of enhancements to topology redundancy, including support for CP/UP separation.

Enhancements of Topology, Routing, and Transport

Specification of enhancements to improve topology-wide fairness, multi-hop latency, and congestion mitigation.

Regarding the enhancements of topology adaptation, the following agreements are reached.

Enhancements of topology adaptation are to be considered to improve robustness (e.g., for rapid shadowing), load balancing between different IAB nodes, between IAB donor DUs and IAB donor CUs, and signaling load reduction.

The RAN2 discusses enhancements of RLF indication/handling with a focus on reduction of service interruption after a BH RLF.

CHO and potential IAB-specific enhancements of CHO are under consideration.

DAPS and potential IAB-specific enhancements of DAPS are not excluded at this time (although how to support DAPS is not clear because no PDCP is present).

For message bundling, the RAN2 waits for at least further progress to be seen in the RAN3 for the topology adaptation procedure.

The RAN2 discusses local rerouting, including benefits over central route determination, and how to address topology-wide objectives.

In this supplementary note, various topics of the topology adaptation enhancement of Rel-17 eIAB.

Discussion

Enhancements of BH RLF Indication

In Rel-16 email discussion, four types of BH RLF notifications as illustrated in FIG. 32 were discussed. Ultimately, only "Recovery failure" corresponding to Type 4 was defined as Rel-16 BH RLF indication. This allows a child IAB-MT to recognize an RLF on a parent BH link to initiate an RLF recovery procedure.

Finding 1: In Rel-16, only "Recovery failure" corresponding to Type 4 was defined as the BH RLF indication.

The RAN2 agreed to "consider enhancements of topology adaptation to improve robustness (e.g., for rapid shadowing). This means that a BH RLF occurs more frequently in Rel-17 compared to Rel-16 as the radio states are assumed to change more dynamically.

Finding 2: In Rel-17, a BH RLF occurs more frequently compared to Rel-16 deployments because the radio states change more dynamically, such as rapid shadowing.

The problem in Rel-16 is that the child IAB node cannot transfer upstream data during RLF recovery of the parent, or even if the data is transferred, the parent cannot transfer the data due to a BH RLF. Thus, no data can reach the IAB donor in any case and service is interrupted.

Finding 3: Using Rel-16 BH RLF indication (Type 4) causes data transfer to be suspended at the IAB node while RLF recovery of the parent is in progress.

Thus, the child IAB node should be notified of a BH RLF of the parent as soon as possible in order to take appropriate action to reduce the delay. This is in line with the RAN2 agreement that "the RAN2 discusses enhancements of RLF indication/handling with a focus on reduction of service interruption after a BH RLF". Thus, the RAN2 should introduce a BH RLF indication "Trying to recover" corresponding to Type 2. Note that Type 1 and Type 2 have the same meaning.

Proposal 1: The RAN2 should agree with the fact that the BH RLF indication "Trying to recover" corresponding to Type 2 has been introduced. Whether the transmission is performed using the BAP Control PDU, the SIB 1, or both of these requires further study.

When introducing the Type 2 indication as in Proposal 1, it is very straight forward to introduce "BH link recovery" corresponding to Type 3 since the child IAB-MT should also be notified when the BH RLF of the parent is recovered. However, it should be considered whether such an explicit indication is indeed necessary, since the RAN2 agreed to "consider enhancements of topology adaptation to improve signaling load reduction". When the Type 3 indication is transmitted in a dedicated manner to all child IAB nodes (e.g., via a BAP Control PDU), significant overhead may occur.

Figure 33:
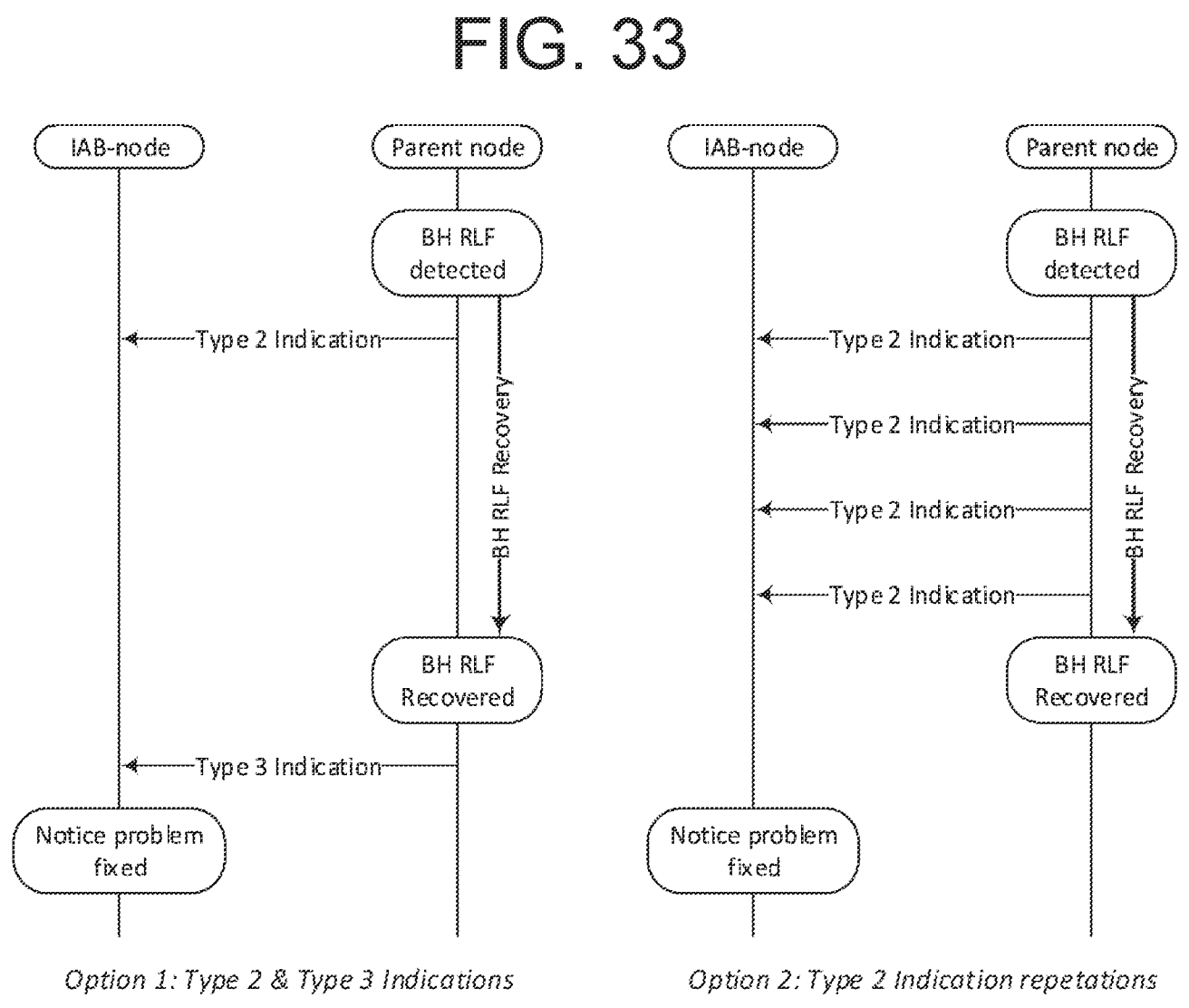

For example, for the Type 2 Indication transmitted via the SIB 1, the indication is no longer broadcast when the BH link is not under the RLF (i.e., "recovered") as illustrated in Option 2 in FIG. 33. Therefore, downstream IAB nodes and the UE recognize whether the BH link has been recovered based on the absence of the Type 2 Indication in the SIB 1. As a matter of course, when the Type 3 Indication is transmitted via the BAP Control PDU, it has an advantage that the downstream IAB nodes can promptly know that the BH link has been recovered. However, the UE includes no BAP layer and thus disadvantageously fails to recognize the recovery. Thus, RAN2 should study whether the Type 3 Indication is really necessary.

Proposal 2: When Proposal 1 can be agreed on, the RAN2 should consider whether to introduce an explicit BH RLF indication, in other words, "BH link recovered" corresponding to Type 3, the indication being provided when the BH RLF is no longer present.

When Proposal 1 and/or Proposal 2 can be agreed on, the operation of the IAB-MT, which has received the indication, regarding during recovery of the BH link should be considered. The following was proposed: when the IAB-MT receives the Type 2 Indication, the IAB-MT reduces/stops the SR, and when the IAB-MT receives the Type 3 Indication (i.e., the BH RLF is no longer present in the parent IAB node), the IAB-MT resumes operation. This is one desirable operation of the IAB-MT when the parent node is trying to recover the BH link. It is assumed that other operations of the IAB-MT, such as operation of suspending all of the RBs, are also possible.

Proposal 3: The RAN2 should agree with that the IAB-MT, which has received the Type 2 Indication and then reduced/stopped the scheduling request, resumes the scheduling request when the BH RLF is no longer present in the parent node.

In consideration of the agreement that "the RAN2 discusses enhancements of RLF indication/handling with a focus on reduction of service interruption after a BH RLF", it should rather discuss how the IAB-MT operates to reduce service interruption. Local rerouting and conditional handover (CHO) enhancements may be considered as candidates for solutions when combined with BH RLF indication, but they are still under consideration. In our view, a common aspect of local rerouting and CHO is that certain kinds of trigger conditions are required. As such, the Type 2 indications may serve such purposes. Thus, in addition to Proposal 3, the RAN2 should discuss other IAB-MT operations performed when the parent node is attempting to recover from the BH RLF.

Proposal 4: The RAN2 should discuss other IAB-MT operations when receiving a BH RLF indication of Type 2. Although further considerations are needed, these are, for example, triggering local rerouting and/or conditional handover.

Enhancements of Conditional Handover

The conditional handover (CHO) is introduced in Rel-16 to improve mobility robustness. In our understanding, the CHO can be used for the designated Rel-16 IAB. The RAN2 agreed that "CHO and potential IAB-specific enhancements of CHO are under consideration". Therefore, it is worth considering the CHO enhancements of eJAB in addition to Rel-16 CHO baseline. Rel-16 CHO is executed when the corresponding CHO event (A3/A5) is satisfied or when a selected cell is a CHO candidate as a result of cell selection for RRC reestablishment as illustrated in FIG. 34.

The CHO event A3/A5 can be satisfied when the IAB node experiences a BH RLF on the BH link. On the other hand, these trigger conditions cannot be satisfied for an IAB-specific RLF, i.e., an RLF due to reception of a BH RLF indication (Type 4), because the radio state of the BH link of the IAB node itself is good. In this case, one desirable operation is to execute CHO when the IAB node receives the BH RLF indication.

Finding 4: The Rel-16 CHO is not automatically triggered/executed due to the CHO event A3/A5 in the IAB-MT because the BH RLF recovery of the parent is in progress, and even if the recovery fails, the BH link between the IAB-MT and the parent is still good.

Therefore, in order to improve the topology adaptation of Rel-17 eIAB, it is worth discussing additional trigger conditions for CHO. At least the existing BH RLF indication (i.e., Type 4) is considered to be a promising candidate as a new trigger, but if introduced, further discussion can be conducted on whether CHO should be also executed upon receipt of the Type 2 Indication.

Proposal 5: The RAN2 should discuss whether additional trigger conditions for CHO are defined at least when the IAB node receives the BH RLF indication (type 4). When the additional trigger condition is introduced, further consideration is needed to see if is applicable to Type 2.

When Proposal 5 is agreed on, the problem may arise that CHO may be triggered at the same time for all CHO candidates (i.e., candidate cells), because of a kind of "forced" trigger by the BH RLF indication although not depending on the CHO event A3/A5.

In the current specification, "if multiple NR cells are triggered in conditional reconfiguration execution, it is up to UE implementation which one to select. For example, the UE considers beams and beam quality to select one of the triggered cells for execution". This is primarily intended for the UE.

Finding 5: In Rel-16 CHO, when a plurality of candidate cells trigger CHO execution, it is up to the UE implementation which cell to select.

It may not always be the best for the IAB-MT when the IAB-MT selects one of the cells triggered by the implementation depending on local radio quality, etc., because the topology-wide objectives are properly handled by the IAB donor. Thus, the RAN2 should discuss how to confirm CHO execution of IAB donor control for additional trigger conditions such as Proposal 5. For example, the IAB donor may configure priority information associated with the CHO candidate in the CHO configuration. The IAB-MT should select the highest priority cell from all triggered CHO candidates that satisfy a certain radio quality (e.g., S-criterion).

Proposal 6: The RAN2 should consider whether the CHO execution of IAB donor control is required as an additional enhancement when all candidate cells trigger the CHO upon reception of an BH RLF indication.
Enhancements of Local Rerouting In Rel-16, the local rerouting is allowed only when a BH RLF occurs, as described below. NOTE: for example, data buffering in a transmission part of a BAP entity is up to the implementation until an RLC-AM entity receives an acknowledgment response. For a BH RLF case, the transmission part of the BAP entity may re-route the BAP data PDUs, which has not been acknowledged by the lower layers before the BH RLF, to the alternative path.

This indicates that the local rerouting is beneficial to improve robustness and service interruption due to the BH RLF. Thus, Rel-17 should be aimed at applying local rerouting to other cases, agreed upon by the RAN2, to improve load balancing, signaling reduction, robustness and/or service interruption. It is worth considering additional conditions for starting/stopping the local rerouting other than BH RLF, such as by receiving a BH RLF indication as in Proposal 4 (to improve robustness/service interruption) and/ or by receiving flow control feedback (for load balancing/ congestion mitigation). In other words, in general, the parent and/or child should be able to trigger the local rerouting of the IAB node under certain conditions.

Finding 6: In Rel-16, local rerouting is allowed only for a BH RLF case. This improves robustness and service interruption.

Proposal 7: The RAN2 should discuss whether an additional condition is introduced to start/stop local rerouting. This allows other IAB nodes to trigger, such as by receiving a BH RLF indication as in Proposal 4 and/or by receiving flow control feedback.

When agreed on, not only in other cases in Rel-17, i.e., BH RLF, "the RAN2 discusses local rerouting, including benefits over central route determination, and how to address topology-wide objectives", thus, the problem in Rel-16 should be considered from a viewpoint of the topology-wide objectives. Needless to say, the IAB donor has complete knowledge and control over the IAB topology and thus handles the topology-wide objectives.

In Rel-16 local rerouting, it is up to the implementation of the IAB node which path is selected as an alternative path as long as the destination is the same. This means that local rerouting is based on local determinations and cannot be controlled from a viewpoint of the IAB donor. This may not be consistent with the topology-wide objectives, especially when many local determinations occur and accumulate in the IAB topology.

Finding 7: In Rel-16 local rerouting, which path is selected as the alternative path is up to the implementation of the IAB-MT.

Thus, when local rerouting is enhanced beyond a BH RLF case, the controllability of the IAB donor should become more important. Since the IAB node needs to select the alternative path when performing local rerouting, it is straight forward that the IAB donor can configure the alternative path. Modeling of the alternative path needs to be further considered for such as whether alternative paths have the same routing ID.

Proposal 8: The RAN2 should consider whether the IAB donor can configure an alternative path for the IAB node in addition to Rel-16 routing configuration.

As another aspect of the controllability of the IAB donor, it should be taken into account that the IAB donor should recognize local rerouting and may start/stop the local rerouting at the IAB node for coexistence of the local rerouting and topology-wide objectives. For example, the IAB donor may consider whether the topology-wide objectives are still achieved based on recognition of which IAB node is currently performing the local rerouting. When the IAB donor finds that the topology-wide objectives cannot be achieved, the IAB donor may instruct the IAB node to start/stop local rerouting, or the IAB donor may change the routing configuration for the entire IAB topology.

How to address the topology-wide objectives through the local rerouting is completely up to the implementation of the IAB donor, but the IAB donor may need information and controllability of the local determination of the IAB node.

Proposal 9: The RAN2 should discuss whether the IAB node needs to notify the IAB donor when starting/stopping local rerouting.

Proposal 10: The RAN2 should discuss whether the IAB donor can instruct the IAB node to start/stop local rerouting.
Enhancements of BH RLF Recovery and Cell (Re)selection In an RRC reestablishment procedure, the IAB-MT first executes a cell selection procedure in order to find an appropriate cell. In the cell selection procedure, potential problems were pointed out in Rel-16, such as one that the IAB-MT may select its descendant node. Thus, this was discussed in email discussion.

As illustrated in FIG. 35, possible five solutions were discussed and summarized together with the rapporteur's view.

The conclusion was that "no further action is taken on this topic in Rel-16". This means that RAN2 agreed on "Option 4: Nothing needed since RRC reestablishment will fail if there is no BH connectivity". Option 4 requires waiting for a failure (expiry of T301) and finally going to an idle state and was thus acceptable in a Rel-16 deployment scenario even when further time is required for BH RLF recovery.

Finding 8: In Rel-16, when the IAB node attempts an RRC reestablishment request to the descendant node, the IAB node needs to wait for a failure of the attempt, and finally go to an idle state.

In Rel-17, from the viewpoint of Finding 2, cell (re) selection and RRC reestablishment may further frequently occur. Thus, suboptimal operation, in other words, operation in accordance with Finding 8, shall cause significant deterioration in performance from the viewpoint of stability of the IAB topology and service continuity. Thus, in order to optimize the operation of the IAB-MT during BH RLF recovery, "the topic can be discussed again in Rel-17", as stated by the rapporteur of the above email discussion.

Proposal 11: RAN2 should agree to study optimization of cell (re)selection in order to avoid reestablishment to an inappropriate node (for example, a descendant node).

It may be assumed that a common concept in the solutions identified except for Option 4 above is that the IAB-MT is provided with a type of either a permission list or a block list for the purpose of cell selection. For example, given that topology changes may frequently occur in Rel-17 due to "inter-donor IAB-node migration", the permission list and the block list have advantages and disadvantages depending on the topology and the positions of the IAB nodes.

For example, from the viewpoint of an IAB node close to an IAB donor, in other words, the uppermost in DAG topology, because the number of candidate nodes is small, and in some cases only an IAB donor DU, providing the permission list is more reasonable.

However, in another example from a viewpoint of an IAB node very distant from the IAB donor, in other words, the lowermost in DAG topology, a great number of candidate nodes may need to be included in the permission list. Instead, for example, the block list may be more suitable because the block list includes only downstream IAB nodes of the IAB node to be concerned and in some cases includes only a small number of child IAB nodes, thus reducing overhead.

One of the concerns about the permission list is that, due to the properties of "the inter-donor IAB-node migration" in Rel-17, the list may need to include candidate IAB nodes belonging to different/adjacent IAB topologies, and may thus have an increased size. On the other hand, downstream IAB nodes of course belong to the same IAB topology, and thus the block list includes no such concerns.

Finding 9: The permission list and the block list have advantages and disadvantages depending on the topology and the positions of the IAB nodes.

Thus, when information is provided to the child IAB node for the purpose of cell selection, the IAB donor (or the parent IAB node) may be desirably able to select the use of either the permission list or the block list. Note that study should be also conducted on whether the reuse of this information for the purpose of cell reselection is beneficial.

Proposal 12: RAN2 should agree to provide the permission list or the block list (i.e., selection structure) to the IAB-MT for the purpose of cell selection in order to avoid reestablishment to a descendant node. Whether these lists can also be used for a cell reselection procedure requires further study.

If Proposal 12 can be agreed on, how to provide the information (in other words, the permission list or the block list) should be further studied. Option 1 assumes CHO configuration, and some enhancements may be required. Option 2 assumes additional indications, for example, the BH RLF indication of Type 2. Option 3 assumes provision of information of the overall topology, which is not present in the existing configuration. Option 5 assumes OAM-based configuration; however, this is questionable as the rapporteur pointed out.

Considering again the assumption of Rel-17 (i.e., Proposal 2), in other words, the need for the parent IAB node or the IAB donor to provide the list to the child IAB node in response to a topology change, the permission list/block list needs to be dynamically provided. Thus, Option 5, in other words, OAM, should be excluded. Which method, in other words, which method out of Options 1, 2, and 3, is to be used as the baseline for the enhancements requires further study.

Proposal 13: RAN2 should agree that the parent IAB node or the IAB donor dynamically provides the permission list/block list each time the topology is changed. The details thereof require further study.

Enhancements of Lossless Delivery

In the stage of research of Rel-15, the problem of multi-hop RLC ARQ was discussed and captured in Section 8.2.3 of TR. In Rel-16, the protocol stack was defined for the IAB including unsplit RLC layers. In other words, in Rel-16, end-to-end ARQ was excluded, and hop-by-hop ARQ was adopted.

Regarding the hop-by-hop ARQ, the problem in end-to-end reliability, in other words, lossless delivery with UL packets, was identified. As illustrated in FIG. 36, three solutions were identified and evaluated.

In Rel-16, "Modification of PDCP protocol/procedures" being a first solution was not adopted because it would affect a Rel-15 UE.

"Rerouting of PDCP PDUs buffered on intermediate IAB-nodes" corresponding to a second solution was supported as an implementation selection in the BAP layer. The BAP layer may implement the second solution on the assumption that "data buffering in a transmission part of a BAP entity until an RLC-AM entity receives an acknowledgment response is implementation dependent, for example". These BAP implementations were considered in order to avoid packet loss in "most" of the cases of the Rel-16 deployment scenario, in other words, the cases where stationary IAB nodes are used. However, the implementations were not perfect as illustrated in FIG. 36, for example.

"Introducing UL status delivery" corresponding to a third solution was a promising solution for guaranteeing lossless delivery of UL data, with evaluation results cited in FIG. 36 taken into consideration. The idea was to delay the RLC ARQ to the UE, so that PDCP data recovery at the UE is initiated when necessary. However, this was not defined in Rel-16 because it had been assumed that UL packets would be rarely dropped due to topology change as the stationary IAB node was assumed.

Considering the assumption of Rel-17, in other words, from the viewpoint of Proposal 1, it is no longer rare that UL packets are lost during the topology change, which occurs frequently in Rel-17, and thus the third solution should be further studied. Thus, RAN2 should discuss an enhancement mechanism for guaranteeing lossless delivery in an L2 multi-hop network, in addition to the results captured in TR.

Proposal 14: RAN2 should agree to introduce a solution identified in TR 38.874, in other words, a mechanism to guarantee lossless delivery under a condition that the topology change possibly frequently occur based on some form of "UL status delivery".

For the details of the third solution, in other words, "Introducing UL status delivery", two options, namely C-1 and C-2, were discussed via email as illustrated in FIG. 37.

Regarding C-1 above, it is assumed that a "confirmation" from the IAB donor needs to be defined in the BAP or the RRC for end-to-end signaling transfer via the multi-hop L2 network. Thus, in order to define the option, a relatively high standard effort shall be required.

Regarding C-2 above, when C-2 fully functions in the IAB topology and the RLC ACK is to be transmitted to the UE (or the downstream IAB node) even if it needs to be assumed that OAM configures all of the IAB nodes with the use of the option, it finally depends on IAB-DU implementation, and thus C-2 can be actually implemented for a Rel-16 IAB node as well. Because hop-by-hop feedback is assumed and no additional Control PDUs are assumed, C-2 is easier to implement than C-1. Thus, C-2 should be the baseline for the enhancements of Rel-17 for lossless delivery of the UL packets.

Finding 10: C-2 being a solution of "Introducing UL status delivery" may be the baseline for the enhancements of Rel-17, and this can be implemented for Rel-16 as well.

Note that, because Rel-17 should assume dynamic topology change that causes UL packet loss, the enhancements of Rel-17 shall support C-2 as a standard support function. At least in the specification of stage 2, an overall mechanism based on C-2 should be described. Otherwise, in the 3GPP standard, lossless delivery is not guaranteed during the handover of the IAB node. In stage 3, although minor changes such as those of the RLC and/or the BAP are expected, these are regarded as internal operations of the IAB node, and thus details thereof may not be defined.

Proposal 15: RAN2 should agree to define an RLC ARQ mechanism for lossless delivery of UL packets in stage 2. This delays transmission of the ACK to the child node/UE before the ACK is received from the parent IAB node (i.e., C-2). Whether to define this in stage 3/how to define this require further study.

Inter-Donor IAB-Node Migration

The IAB node integration procedure is introduced into Rel-16 and is used for the initial integration of IAB nodes. In other words, the IAB node integration procedure is still outside the service.

Rel-17 is intended to specify the inter-donor IAB-node migration, which provides robust operation and is to be applied to mobile IAB nodes. In contrast to Rel-16, the inter-donor IAB-node migration in Rel-17 is performed in a working phase, and thus the inter-donor IAB-node migration of one IAB node affects the entire topology and causes service interruption. In other words, for the Rel-17 inter-donor IAB-node migration, study needs to be conducted about how each of all IAB nodes in the IAB topology migrates to another IAB donor, specifically how RRC reconfiguration with synchronization (i.e., handover command) is provided to the affected IAB nodes.

Figure 38:
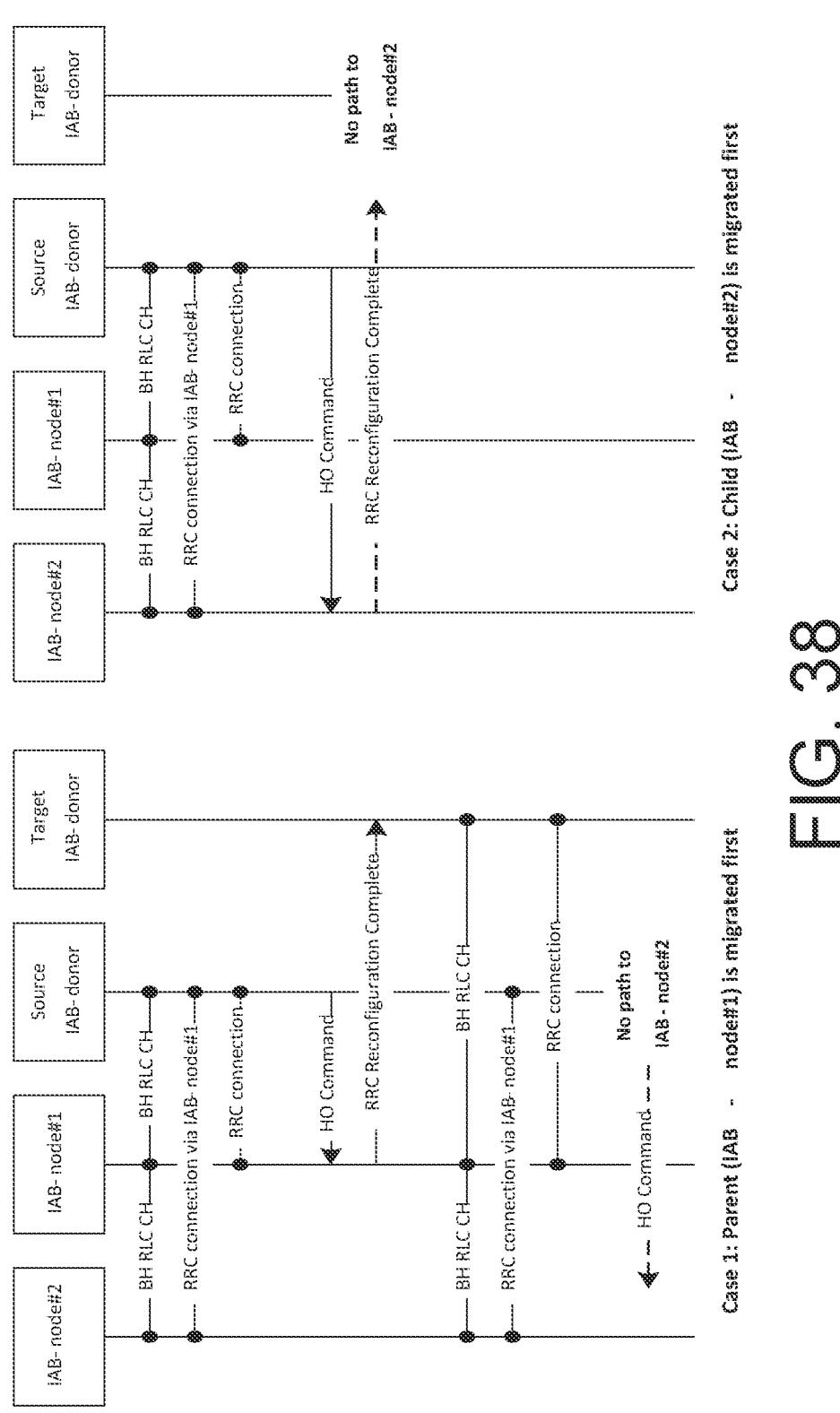
FIG. 38 illustrates potential RAN2 signaling occurred during inter-donor IAB-node migration.

As illustrated in FIG. 38, assuming that a child node (IAB node #2) is connected to a source IAB donor via a parent node (IAB node #1), a set of signaling problems may occur.

Case 1: When the parent is first migrated, the RRC signaling path between the child and the source donor is released. Therefore, how the child node can be migrated is unknown. Case 2: When the child is first migrated, the RRC signaling path to the target donor via the parent node has yet to be established. Accordingly, how the child node accesses the target donor (i.e., how to complete and transmit the RRC reconfiguration to the target donor) is unknown.

For Case 1, the CHO may be reused using some enhancements of the child node. In other words, when the parent node is migrated, the CHO is executed in the child node. For Case 2, the transmission of the child node's RRC reconfiguration to the target donor may be delayed by the parent node of the child node, for example.

In either case, an option may be that the child node is first released and that re-integration is then performed by using the Rel-16 procedure. However, this may not a desirable solution for Rel-17, considering critical service interruption.

Although RAN3 has been discussing the general procedure of the inter-donor IAB-node migration, RAN2 needs to study the impact of RAN2 on how to reconfigure a plurality of IAB nodes in a multi-hop network.

Proposal 16: RAN2 needs to study how to reconfigure multi-hop IAB nodes for the inter-donor IAB-node migration.

The invention claimed is:

1. A communication control method comprising:
   receiving, by a first relay node from a second relay node, a first indication indicating a failure in a backhaul link;
   in response to receiving the first indication, executing by the first relay node, first local rerouting to transfer a first data packet to a first alternative path different from a path to the second relay node;
   after executing the first local rerouting, receiving by the first relay node from the second relay node, a second indication indicating a recovery in the backhaul link;
   in response to receiving the second indication, transmitting, by the first relay node, a second data packet to the path to the second relay node;
   receiving, by the first relay node, a flow control feedback message from a child node of the first relay node; and
   determining, by the first relay node, whether to perform second local rerouting to transfer a third data packet to a second alternative path different from a path to the child node based on specified information included in the flow control feedback message.

2. A relay node comprising a processor and a memory, the processor configured to:
   receive from a second relay node, a first indication indicating a failure in a backhaul link,
   in response to receiving the first indication, execute first local rerouting to transfer a first data packet to a first alternative path different from a path to the second relay node,
   after executing the first local rerouting, receive from the second relay node, a second indication indicating a recovery in the backhaul link,
   in response to receiving the second indication, transmit a second data packet to the path to the second relay node;
   receive a flow control feedback message from a child node of the relay node; and
   determine whether to perform second local rerouting to transfer a third data packet to a second alternative path different from a path to the child node based on specified information included in the flow control feedback message.

3. An apparatus configured to control a first relay node, the apparatus comprising a processor and a memory, the processor configured to:
   receive from a second relay node, a first indication indicating a failure in a backhaul link,
   in response to receiving the first indication, execute first local rerouting to transfer a first data packet to a first alternative path different from a path to the second relay node,
   after executing the first local rerouting, receive from the second relay node, a second indication indicating a recovery in the backhaul link,
   in response to receiving the second indication, transmit a second data packet to the path to the second relay node;
   receive a flow control feedback message from a child node of the first relay node; and
   determine whether to perform second local rerouting to transfer a third data packet to a second alternative path different from a path to the child node based on specified information included in the flow control feedback message.

* * * * *